US008719617B2

(12) United States Patent  
Gu et al.

(10) Patent No.: US 8,719,617 B2  
(45) Date of Patent: *May 6, 2014

(54) METHOD AND DEVICE FOR REALIZING IP MULTIMEDIA SUBSYSTEM DISASTER TOLERANCE

(75) Inventors: Jiongjiong Gu, Shenzhen (CN); Kai Wen, Langfang (CN); Feng Liang, Shenzhen (CN); Linfei Shen, Shenzhen (CN); Shufeng Shi, Xi'an (CN)

(73) Assignee: Huawei Technologies Co., Ltd., Shenzhen (CN)

(*) Notice: Subject to any disclaimer, the term of this patent is extended or adjusted under 35 U.S.C. 154(b) by 106 days.

This patent is subject to a terminal disclaimer.

(21) Appl. No.: 13/285,681

(22) Filed: Oct. 31, 2011

(65) Prior Publication Data

US 2012/0044802 A1 Feb. 23, 2012

Related U.S. Application Data

(63) Continuation of application No. 12/428,810, filed on Apr. 23, 2009, now Pat. No. 8,069,365, which is a continuation of application No. PCT/CN2007/070943, filed on Oct. 23, 2007.

(30) Foreign Application Priority Data

Oct. 24, 2006 (CN) .......................... 2006 1 0150721  
Aug. 10, 2007 (CN) .......................... 2007 1 0135727

(51) Int. Cl.  
*G06F 11/00* (2006.01)

(52) U.S. Cl.  
USPC ............................................ 714/4.1; 714/13

(58) Field of Classification Search  
None  
See application file for complete search history.

(56) References Cited

U.S. PATENT DOCUMENTS

| 6,202,071 B1 | 3/2001 | Keene |
| 2004/0146040 A1 | 7/2004 | Phan-Anh et al. |
| 2004/0185848 A1 | 9/2004 | Phan-Anh et al. |

(Continued)

FOREIGN PATENT DOCUMENTS

| CN | 1756181 A | 4/2006 |
| CN | 1780482 A | 5/2006 |

(Continued)

OTHER PUBLICATIONS

U.S. Appl. No. 12/428,810, filed Oct. 31, 2011.

(Continued)

*Primary Examiner* — Michael Maskulinski  
(74) *Attorney, Agent, or Firm* — Leydig, Voit & Mayer, Ltd.

(57) ABSTRACT

A method for realizing an Internet protocol (IP) multimedia subsystem (IMS) disaster tolerance includes the steps as follows. An S-CSCF receives a user registration, and backs up necessary data which is required when a user service processing is restored on a storage entity in a network. An I-CSCF of user's home domain receives a service request of the user, and if it is found that the S-CSCF currently providing a service for the user fails, assigns a new S-CSCF to the user, and forwards the service request to the newly assigned S-CSCF. The newly assigned S-CSCF interrogates and acquires subscription data of the user and the necessary data backed up by the original S-CSCF from the storage entity, and then restores the user service processing according to the subscription data and the backup data. A device for realizing an IMS disaster tolerance is also provided.

10 Claims, 14 Drawing Sheets

(56) References Cited

U.S. PATENT DOCUMENTS

| | | |
|---|---|---|
| 2007/0130471 A1 | 6/2007 | Walker Pina et al. |
| 2008/0175157 A1 | 7/2008 | Lim et al. |
| 2008/0274739 A1 | 11/2008 | Wu |
| 2008/0316931 A1 | 12/2008 | Qiu et al. |
| 2010/0257272 A1 | 10/2010 | Belinchon Vergara et al. |

FOREIGN PATENT DOCUMENTS

| | | |
|---|---|---|
| CN | 101170553 B | 7/2011 |
| EP | 1 916 821 A1 | 4/2008 |
| WO | WO 02/102107 A1 | 12/2002 |
| WO | WO 2005/020619 A1 | 3/2005 |

OTHER PUBLICATIONS

1st Office Action in corresponding European Application No. 07817134.5 (Nov. 2, 2010).

Written Opinion of the International Searching Authority in corresponding PCT Application No. PCT/CN2007/070943 (Feb. 14, 2008).

International Searching Authority in corresponding PCT Application No. PCT/CN2007/070943 (Feb. 14, 2008).

"3GPP TR 23.820—Technical Specification Group Core Network and Terminals; Study on IMS Restoration Procedures (Release 8)," Aug. 2007, Version 0.2.0, $3^{rd}$ Generation Partnership Project, Valbonne, France.

"3GPP TS 24.229—Technical Specification Group Core Network and Terminals; IP multimedia call control protocol based on Session Initiation Protocol (SIP) and Session Description Protocol (SDP); Stage 3 (Release 8)," Jun. 2007, Version 8.0.0, $3^{rd}$ Generation Partnership Project, Valbonne, France.

"3GPP TS 29.228—Technical Specification Group Core Network and Terminals; IP Multimedia (IM) Subsystem Cx and Dx interfaces; Signalling flows and message contents (Release 7)," Jun. 2007, Version 7.6.0, $3^{rd}$ Generation Partnership Project, Valbonne, France.

"3GPP TS 29.229—Technical Specification Group Core Network and Terminals; Cx and Dx interfaces based on the Diameter protocol; Protocol details (Release 7)," Mar. 2007, Version 7.5.0, $3^{rd}$ Generation Partnership Project, Valbonne, France.

Office Action in corresponding European Patent Application No. 07817134.5 (Apr. 3, 2012).

"Reassignment for S-CSCF During the Terminated Call Procedure," 3GPP TSG SA WG2 Architecture, Jan. 16, 2006, $3^{rd}$ Generation Partnership Project, Valbonne, France.

METHOD AND DEVICE FOR REALIZING IP MULTIMEDIA SUBSYSTEM DISASTER TOLERANCE

CROSS-REFERENCE TO RELATED APPLICATIONS

This application is a continuation of U.S. patent application Ser. No. 12/428,810, filed on Apr. 23, 2009, which is a continuation of International Application No. PCT/CN2007/070943, filed on Oct. 23, 2007. The International Application claims the priority benefit of Chinese Patent Application No. 200610150721.6, filed on Oct. 24, 2006 and Chinese Patent Application No. 200710135727.0, filed on Aug. 10, 2007. The contents of the above identified applications are incorporated herein by reference in their entirety.

FIELD OF THE TECHNOLOGY

The present invention relates to a network disaster tolerance technique, and more particularly, to a method and a device for realizing an Internet protocol (IP) multimedia subsystem (IMS) disaster tolerance.

BACKGROUND

An IMS occupies a pivot position in the service processing for a communication network, and the high reliability of the IMS is the basis of the high reliability of the whole communication network. A serving call session control function (S-CSCF) serving as a network element (NE) for controlling the user service processing in the IMS acts as a core of the whole network service processing, so that a disaster tolerance capability of the S-CSCF is quite important to the high reliability of the IMS.

FIG. 1 is a flow chart that a user who intends to get access to an IMS network subscribes and registers in the IMS network in the prior art.

In FIG. 1, once the user initiates a registration (1. REGISTER) at a terminal, a register request message is sent to a proxy CSCF (P-CSCF) assigned to the terminal by an access domain so as to enter an IMS subsystem. The P-CSCF forwards the register request to an interrogating CSCF (I-CSCF) of user's home domain according to a domain identity of the user (2. REGISTER).

The I-CSCF interrogates from a home subscriber serve (HSS) of the user home domain (3. UAR~4. UAA), and a UAR message carries attribute value pairs (AVPs) as follows: Public-Identity, i.e., IMPU, User-Name, i.e., IMPI, Visited-Network-Identifier, i.e., information acquired from the REGISTER message, and User-Authorization-Type, i.e., a user authorization type, which is valued as REGISTRATION so as to represent an initial registration or re-registration. During the interrogation of this time, the I-CSCF acquires a "capability set of the S-CSCF for providing a service for a user" from the HSS, and the capability set is a group of numbers, which identifies the service processing capability requirements on the S-CSCF. The I-CSCF assigns an S-CSCF capable of supporting the required relevant service processing to the user according to the capability set requirements, and forwards the register request to the assigned S-CSCF (5. REGISTER).

Since it is the initial registration of the user, the S-CSCF needs to perform an authentication on the user. Firstly, the S-CSCF acquires data required by the authentication from the HSS (6. MAR~7. MAA), and then delivers an authentication challenge to the terminal (8. 401~10. 401), and the terminal calculates an authentication response and then re-initiates the registration (11. REGISTER~12. REGISTER), and the register request carries the authentication response calculated by the terminal and a duration of a registration cycle expected by the terminal.

The I-CSCF interrogates from the HSS again (13. UAR~14. UAA), and through the interrogation of this time, it acquires an address name of the S-CSCF currently performing the authentication on the user. The HSS records the address of the S-CSCF of the user when the S-CSCF requests the data required by the authentication of the user from the HSS (6. MAR~7. MAA). After acquiring the address name of the S-CSCF currently performing the authentication on the user, the I-CSCF forwards the register request carrying the authentication response to the S-CSCF (15. REGISTER). After receiving the register request carrying the authentication response, the S-CSCF performs a verification on the authentication response, and if the authentication response is successfully verified, the S-CSCF formally records on the HSS that the user registration is successful, and requests to download subscription data of the user (16. SAR~17. SAA). The S-CSCF returns a response that the register is successful to the user terminal (18. 200 OK~20. 200 OK). In the 200 OK response, the S-CSCF provides a routing address of the S-CSCF itself in a Service-Route header field, and instructs the terminal to generate a Route header field of a session setup request message by utilizing the routing address in the Service-Route when a service request is initiated so as to ensure that the service request can be routed to the registered S-CSCF for being processed. In addition, the 200 OK response further provides the duration of the registration cycle determined through a final negotiation.

After the user registration is successful, the situations of recording the user registration data by each IMS NE are listed as follows. The HSS records the address of the S-CSCF with which the user registers. The S-CSCF records the subscription service data of the user, the duration of the registration cycle, the address of the P-CSCF where the user passes through when getting access to the IMS network, and a contact address of the user terminal. The P-CSCF records the address (i.e. Service-Route) of the S-CSCF for providing the service for the user, and the duration of the registration cycle. The I-CSCF does not record any user information.

FIG. 2 is a flow chart of setting up a session between a calling party and a called party registered in the IMS in the prior art.

When initiating a session, the calling party determines the Route header field in a session setup request according to the Service-Route header field acquired during registration. After the session setup request is sent to the P-CSCF by the calling party, the P-CSCF routes, according to the Route header field (1. INVITE~2. INVITE), the request to the S-CSCF with which the calling party registers. The S-CSCF routes the request message to the I-CSCF of a home domain of the called user according to a domain identity of the called user (3. INVITE). The called I-CSCF interrogates from the HSS to acquire, according to an identity of the called user (4. LIR~5. LIA), the address of the S-CSCF with which the called user registers, and then forwards the session setup request to the S-CSCF (6. INVITE). After receiving the session setup request, the called S-CSCF updates a target address of the session setup request INVITE message by utilizing a contact address of the called user according to saved local registration data of the called user, and forwards the session setup request to the P-CSCF where the called user passes through when getting access to the IMS network (7. INVITE). After receiving the session setup request, the called P-CSCF forwards the session setup request to the called user (8. INVITE), and thus, one initial setup process of the end-to-end session in the IMS network is finished.

If the S-CSCF for providing the service for the user fails, the prior art adopts a mechanism of using a registration timer to trigger a re-registration so as to assign a new S-CSCF to the user. FIG. 3 is a flow chart of triggering re-registration by a registration timer in the prior art.

After registering with the IMS network successfully, the terminal immediately starts the registration timer according to the registration cycle determined through negotiation, and the registration timer triggers the re-registration of the user terminal when the timeout occurs. After the terminal initiates the re-registration, the I-CSCF and the P-CSCF route, according to the records of the initial registration of the terminal (1. Re-REGISTER~5. Re-REGISTER), the register request to the S-CSCF1 with which the terminal registers. If the registered S-CSCF1 fails, the I-CSCF cannot receive any response, and as a result, a timeout occurs to a session initiation protocol (SIP) transaction. Since it is a re-registration process, the I-CSCF returns 408 Request Timeout to the terminal (6. 408~7. 408), and after receiving the response, the terminal immediately initiates an initial registration (8. Ini-REGISTER~9. Ini-REGISTER). The user has ever registered in the IMS network, so that the register request is still routed to the registered but currently failed S-CSCF1, and similarly, the I-CSCF cannot receive any response, and as a result, the timeout occurs to the SIP transaction. Since it is the initial registration, the I-CSCF reselects a new S-CSCF for the user, but firstly it is necessary to acquire the S-CSCF capability set requirements corresponding to the user subscription information from the HSS (13. UAR~14. UAA). Then, the I-CSCF reselects an S-CSCF according to the capability set requirements, and forwards the register request to the new S-CSCF (15. REGISTER), thereby the process of reselecting an S-CSCF for the user affected by the failure is finished. Subsequently, the user finishes registering in the newly assigned S-CSCF according to the initial registration flow. After the user is successfully registered in the new S-CSCF, the IMS network service of the user restores to a normal status.

As known from the above descriptions about the mechanism of using the registration timer to trigger the re-registration, if the S-CSCF for providing the service for the user fails, the network service of the user cannot be restored until the registration timer of the user triggers the re-registration and the S-CSCF is reselected. That is to say, the service interruption duration of the user depends on the duration of the registration cycle of the user. The longer the registration cycle, the longer the service interruption duration of the user. In order to meet the reliability requirements of the telecommunication network, the registration cycle is as short as possible. Unfortunately, if the duration of the registration cycle is set to be too short, it may result in frequent re-registrations. As for a network side, the frequent re-registrations may increase the processing burden of the network. Especially for the wireless access network, the frequent re-registrations excessively occupy the precious air interface resources. As for a user side, the frequent re-registrations cost the limited energy of a wireless terminal, and thereby shorten a standby time of the terminal.

SUMMARY

Accordingly, the present invention is directed to a method for realizing an IMS disaster tolerance so as to improve the network reliability without increasing the system burden.

The present invention is further directed to a device for realizing an IMS disaster tolerance so as to improve the network reliability without increasing the system burden.

The detailed technical solution of the present invention is described as follows.

A method for realizing an IMS disaster tolerance includes the steps as follows.

An S-CSCF receives a user registration, and backs up necessary data which is required when a user service processing is restored on a storage entity in a network.

An I-CSCF of user's home domain receives a service request of a user, and assigns a new S-CSCF to the user and forwards the service request to the newly assigned S-CSCF, if it is found that the S-CSCF currently providing a service for the user fails.

The newly assigned S-CSCF interrogates and acquires subscription data of the user and the necessary data backed up by the original S-CSCF from the storage entity, and then restores the user service processing according to the subscription data and the backup data.

An I-CSCF further includes a detecting module, an assigning module, and a session setup request processing module.

The detecting module is adapted to judge, according to a received session setup request, whether an S-CSCF with which a user registers and the S-CSCF currently providing a service for the user fail or not, and instruct the assigning module to assign a new S-CSCF for the current user, if an S-CSCF with which a user registers and the S-CSCF currently providing a service for the user fail; or instruct the session setup request processing module to forward the session setup request to the S-CSCF currently providing the service for the user, if an S-CSCF with which a user registers and the S-CSCF currently providing a service for the user do not fail.

The assigning module is adapted to assign the new S-CSCF to the user according to an instruction from the detecting module, and instruct the session setup request processing module to forward the session setup request to the newly assigned S-CSCF after finishing assigning the new S-CSCF.

The session setup request processing module is adapted to forward the session setup request according to an instruction from the detecting module or the assigning module.

An S-CSCF further includes a register request processing module, a session setup request processing module, and a user information processing module.

The register request processing module is adapted to send a self address and an address of an I-CSCF of the current domain to a user when a user registration is received, store service data of the user in the user information processing module, and instruct the user information processing module to back up necessary data which is required when a user service processing is restored on a storage entity in a network.

The session setup request processing module is adapted to process a received session setup request according to user information.

The user information processing module is connected to the register request processing module and the session setup request processing module, and is adapted to store the service data, and interact with the storage entity in the network so as to back up and acquire the necessary data which is required when the user service processing is restored.

An HSS includes a user data storing module, adapted to store subscription data of a user, necessary data which is required when the user service is restored, and a registered S-CSCF, and further includes an interrogation request processing module. The interrogation request processing module includes an S-CSCF interrogation request determination submodule, a disaster tolerance restoring interrogation request processing sub-module, and an unregistered user interrogation request processing sub-module.

The S-CSCF interrogation request determination sub-module is adapted to judge whether an interrogation request from an S-CSCF is a disaster tolerance restoring interrogation request or an unregistered user interrogation request, and send the request to the disaster tolerance restoring interrogation request sub-module for being processed if the interrogation request is a disaster tolerance restoring interrogation request; or send the request to the unregistered user interrogation request processing sub-module for being processed if the interrogation request is an unregistered user interrogation request.

The disaster tolerance restoring interrogation request processing sub-module is adapted to extract, according to the interrogation request, corresponding information from the user data storing module and return the corresponding information to the S-CSCF.

The unregistered user interrogation request processing sub-module is adapted to judge whether the user is registered or not according to the S-CSCF with which the user registers, and extract the corresponding information from the user data storing module and return the corresponding information to the S-CSCF if the user is not registered; or return an error response to the S-CSCF if the user is registered.

A method for realizing an IMS disaster tolerance includes the steps as follows.

An S-CSCF receives a user registration, saves service data of a user, and backs up necessary data which is required when a user service processing is restored on a storage entity in a network.

The S-CSCF receives a service request of the user after the service data of the user is lost, and then interrogates from the storage entity and acquires subscription data of the user and the necessary data backed-up in the storage entity, and processes the service request of the user according to the subscription data and the necessary data.

It can be seen from the above description that, in the present invention, the I-CSCF of the user home domain detects a working situation of the S-CSCF with which the user registers. When a calling party initiates a session, a session setup request of the calling party is firstly routed by a calling P-CSCF to an I-CSCF of the calling home domain, and then routed by the I-CSCF of the calling home domain to an S-CSCF with which the calling party registers. During the session setup process, the I-CSCF of the calling home domain may find that the S-CSCF with which the calling party registers fails, and then immediately assigns a new S-CSCF to the calling party, and meanwhile, the I-CSCF of the called home domain may find that the S-CSCF with which the called party registers fails, and then immediately assigns a new S-CSCF to the called party. That is to say, once the S-CSCF fails, the influenced user restores the service when a call is established without waiting for a re-registration timer of a user terminal to trigger a re-registration to restore the network service so as to improve the network reliability without increasing the system burden.

DETAILED DESCRIPTION

A core concept of the present invention lies in that, when a user registers with an S-CSCF, necessary data used in a restoring process is backed up on a storage entity in a network, for example, an HSS; during a session setup process, if an I-CSCF of the user's home domain detects that the S-CSCF with which the user registers fails, the I-CSCF assigns a new S-CSCF to the user; and the newly assigned S-CSCF acquires the backup data and subscription data of the user from the storage entity in the network, and then restores the user service processing.

In order to make the objectives, technical solutions, and efficacies of the present invention more comprehensible, a detailed description is given below with reference to the embodiments and accompanying drawings.

Figure 1:
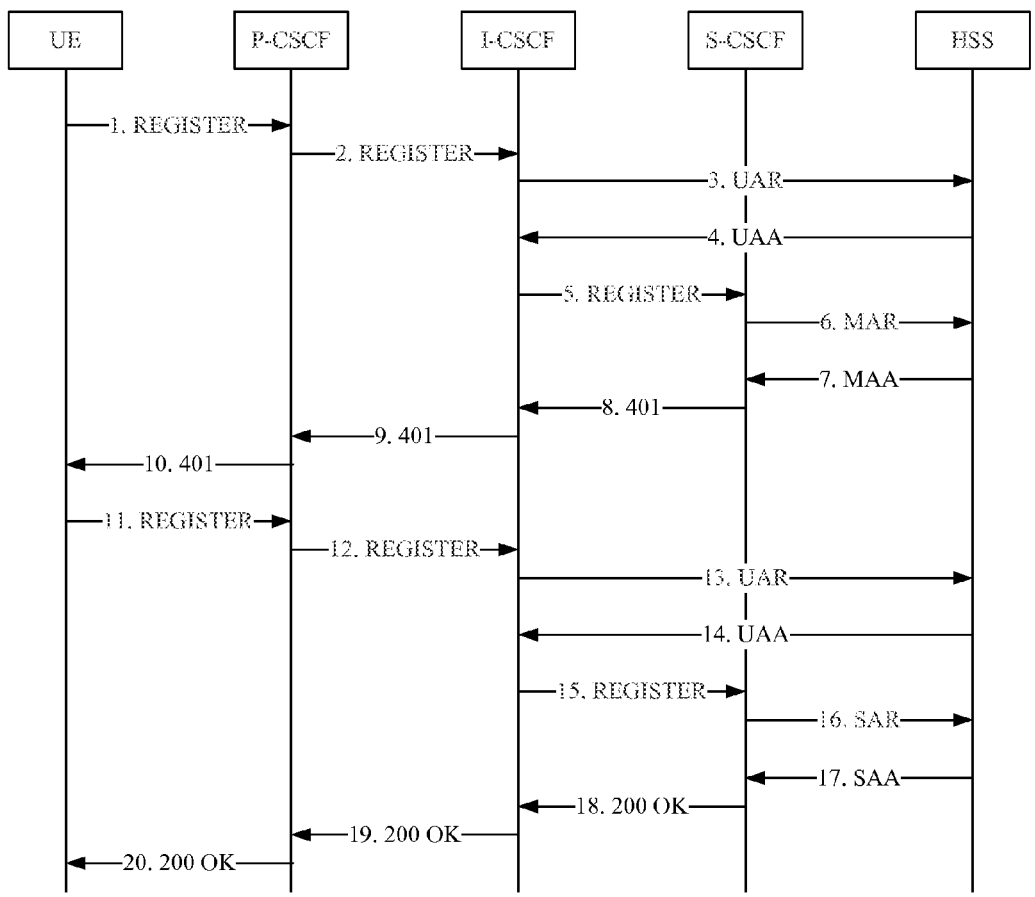
FIG. 1 is a flow chart when a user intending to get access to an IMS network subscribes to and registers with the IMS network in the prior art.
Figure 2:
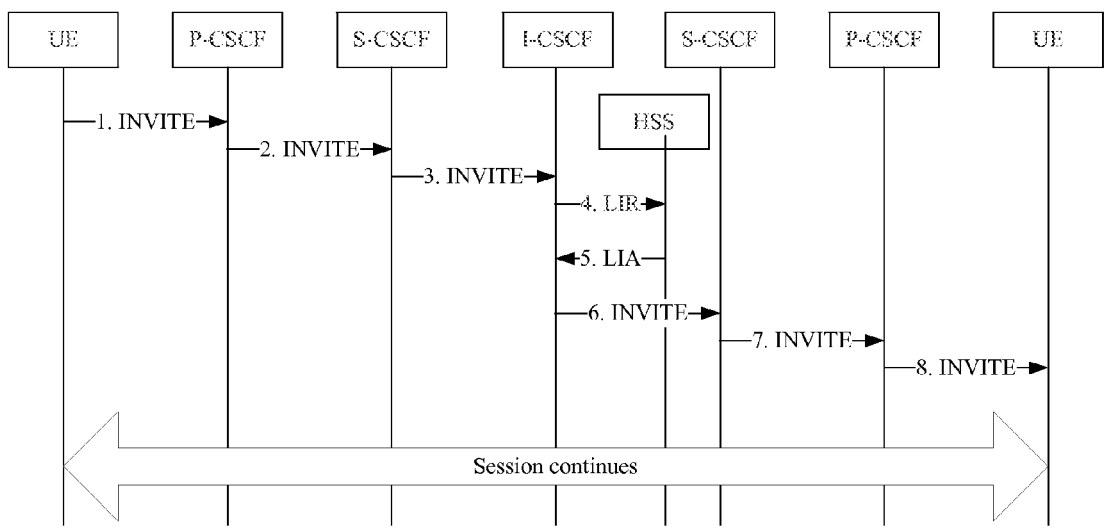
FIG. 2 is a flow chart of setting up a session between a calling party and a called party that register with the IMS in the prior art.
Figure 3:
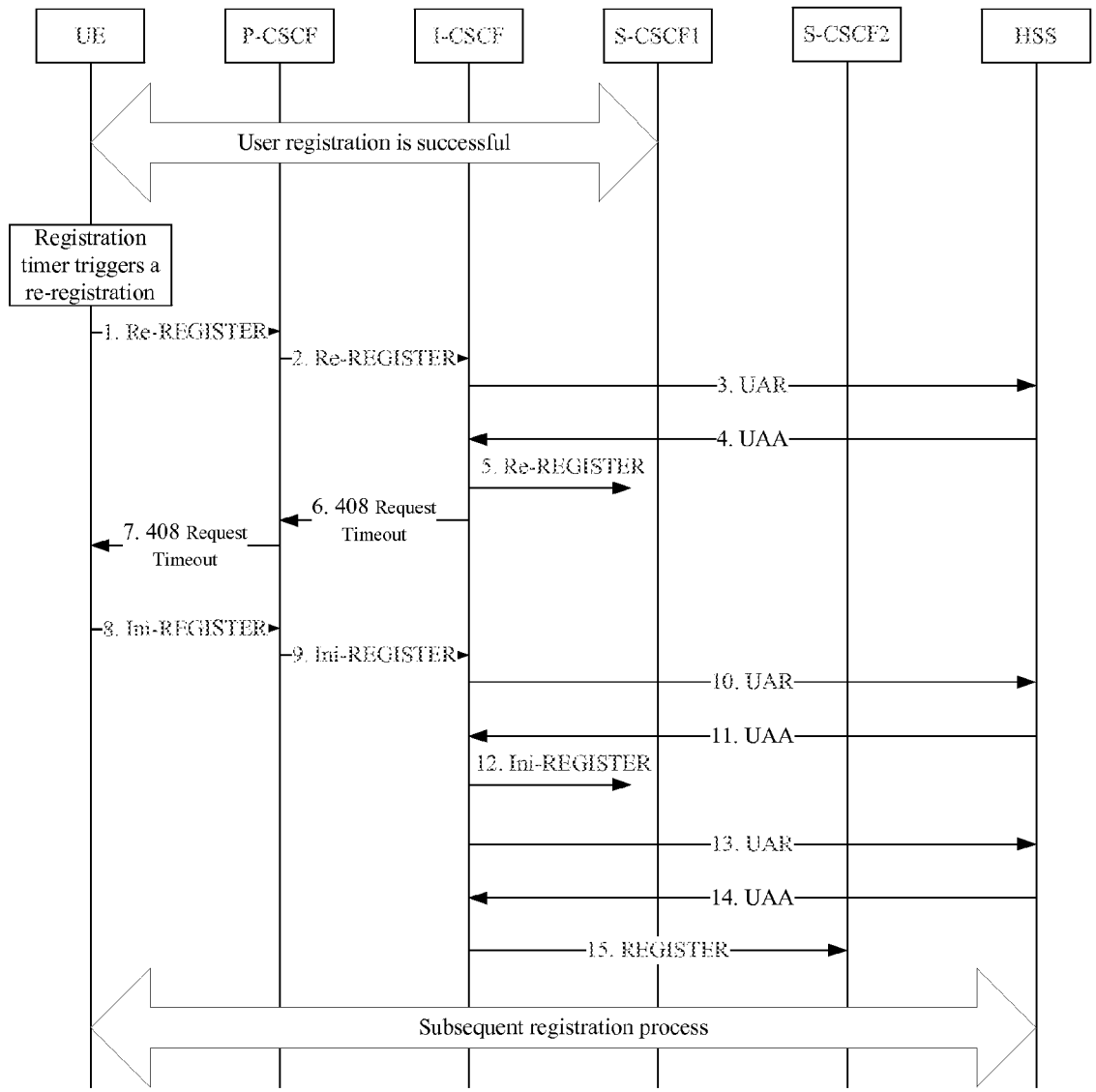
FIG. 3 is a flow chart of triggering a re-registration by a registration timer in the prior art.
Figure 4:
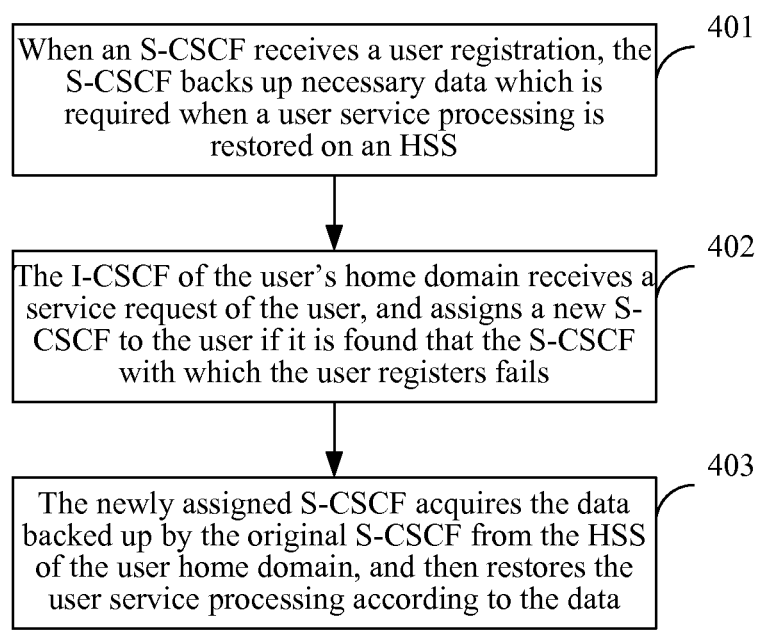
FIG. 4 is an overall flow chart of the present invention.

FIG. 4 is an overall flow chart of the present invention.

In Step 401, when an S-CSCF receives a user registration, the S-CSCF backs up necessary data which is required when a user service processing is restored on an HSS.

Here, the S-CSCF backs up the data on the HSS through a transmission of a new information cell, that is, AVP User-Backup-Data, defined in an embodiment of the present invention. The backup data is saved in the HSS by taking one user as a unit, and when the disaster tolerance restoring is required to perform, the newly assigned S-CSCF may acquire the backup data of the user from the HSS.

In Step 402, an I-CSCF of the user's home domain receives a service request of the user, and assigns a new S-CSCF to the user if it is found that the S-CSCF with which the user registers fails.

By inspecting the status of the S-CSCF currently providing the service for the user, the I-CSCF determines that the S-CSCF currently providing the service for the user fails according to an inspection result. Alternatively, the I-CSCF may directly forward the service request to the S-CSCF, and determines that the S-CSCF currently providing the service for the user fails when no response is received from the S-CSCF after a certain time period elapsed.

Two manners for the I-CSCF to assign the new S-CSCF are provided in the embodiment of the present invention.

In manner A, the I-CSCF interrogates a capability requirement on the S-CSCF in the subscription data of the user from the HSS of the user home domain, and assigns the new S-CSCF according to the capability requirement on the S-CSCF of the user.

In manner B, the I-CSCF statically configures a local redundancy relation among S-CSCFs, selects the S-CSCF having a redundancy relation with the failed S-CSCF from a local redundancy relation table, and assigns the selected S-CSCF to the user.

In Step 403, the newly assigned S-CSCF acquires the data backed up by the original S-CSCF from the HSS of the user home domain, and then restores the user service processing according to the data.

The above steps are described in detail as follows.

Figure 5:
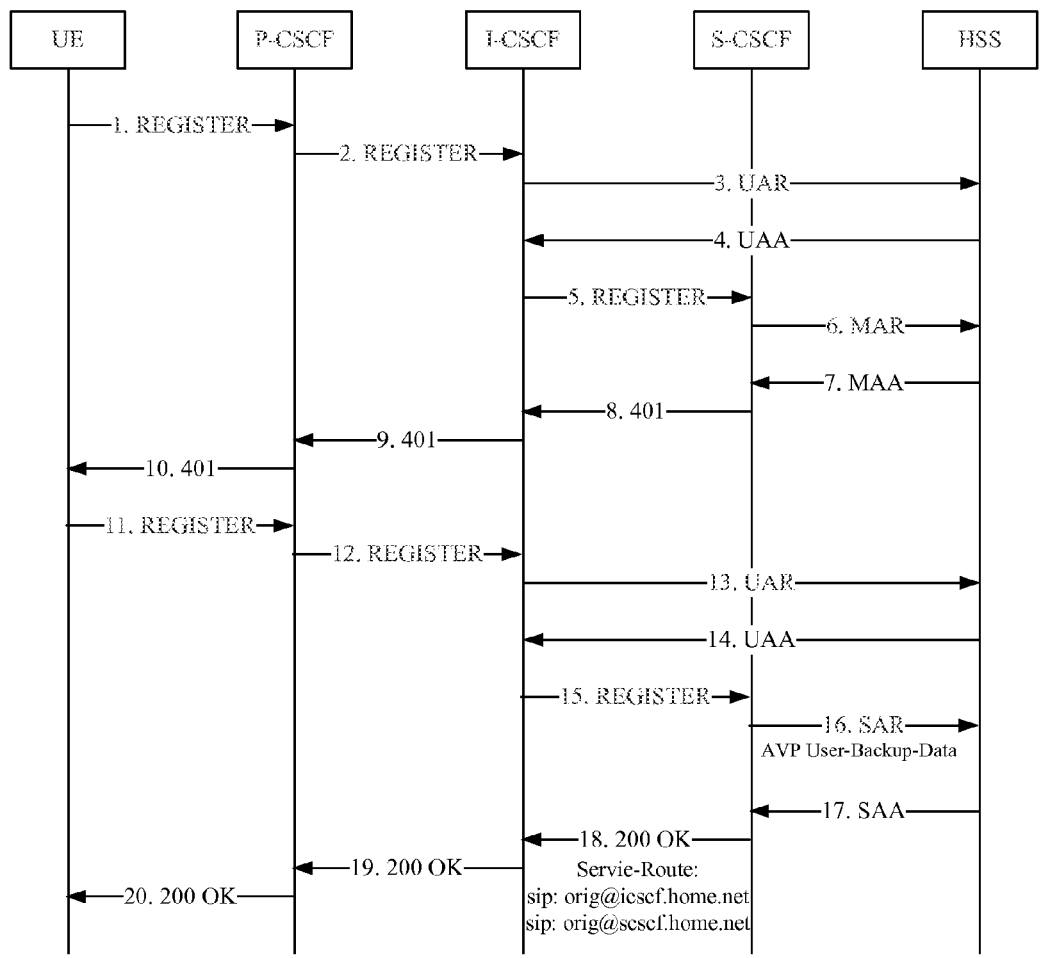
FIG. 5 is a flow chart of a user registration according to an embodiment of the present invention.

FIG. 5 is a flow chart of a user registration according to an embodiment of the present invention.

In FIG. 5, once a user equipment (UE) initiates a registration and is successfully authenticated (1. REGISTER~15. REGISTER), the S-CSCF needs to request to download the subscription data of the user from the HSS (16. SAR). In order to back up the necessary data which is required when the user service processing is restored on the HSS, an AVP with an extended definition needs to be added in the SAR message, that is, AVP User-Backup-Data, and the AVP at least includes the following information:

A SIP URL of the P-CSCF through which the path of the user registration passes is adapted to address the P-CSCF when a called service is restored; and A contact address of the user registration is adapted to address the user terminal when the called service is restored.

The HSS saves the AVP User-Backup-Data according to each user, but it is not necessary to resolve the content of the AVP, that is to say, the content of the AVP is transparent for the HSS.

After successfully acquiring the user data (17. SAA), the S-CSCF returns a register success message (18. 200 OK) to the I-CSCF. In the 200 OK message, Service-Route determined by the S-CSCF includes not only a routing address of the S-CSCF itself, but also a routing address of the I-CSCF of the current domain added before the routing address of the S-CSCF itself. In addition, a calling tag needs to be added in the routing address of the I-CSCF in the Service-Route, for example, the user part of the SIP URL address is set as "orig". The I-CSCF forwards the register success message to the P-CSCF, and then the P-CSCF forwards the register success message to the UE (19. 200 OK~20. 200 OK).

Thus, when a calling party initiates a session, a Route header field in a session setup request INVITE message is determined according to the Service-Route header field of the 200 OK message received during registration, that is, the first one in the Route header field is the I-CSCF address in the current domain, and the second one is the S-CSCF address. Therefore, the session setup request is firstly forwarded from the P-CSCF to I-CSCF, processed by the I-CSCF, and then routed to the S-CSCF for being processed, instead of being directly routed from the P-CSCF to the S-CSCF for being processed. After receiving the session setup request, the I-CSCF determines that a direction of the current session setup request is from a user to a network according to the calling tag.

After the user is registered in the S-CSCF, if the S-CSCF fails, different processing flows are adopted in the present invention depending upon the factors that whether the failed S-CSCF is the S-CSCF with which the calling party or the called party registers, and whether the current session is the first session after the failure or not.

FIG. 6 is flow chart when a calling party initiates a call for a first time after an S-CSCF with which the calling party registers fails according to an embodiment of the present invention.

After the S-CSCF fails, if a user originally registered with the S-CSCF initiates a session setup request for the first time before triggering a re-registration, the session setup request is forwarded to the I-CSCF of the user home domain by the P-CSCF of the user home domain. After the I-CSCF finds that a certain S-CSCF fails, according to the manner A in Step 402, the I-CSCF interrogates the capability requirement on the S-CSCF of the user during the user subscription form the HSS, and immediately assigns a new S-CSCF to the user; or according to the manner B in Step 402, the I-CSCF needs to configure a local S-CSCF redundancy relation table, and selects a new S-CSCF from the table. No matter which one of the above two manners is used, after finishing assigning the S-CSCF, the I-CSCF adds a disaster tolerance restoring indicator parameter in a session setup request to be forwarded to the newly assigned S-CSCF. After receiving the session setup request, the newly assigned S-CSCF determines that the call is a disaster tolerance restoring call according to the disaster tolerance restoring indicator, and interrogates and acquires the backup data and the subscription data of the user from the HSS so as to provide the service for the user.

In FIG. 6, after receiving the session setup request from the user, the P-CSCF routes the call to the I-CSCF according to the Service-Route (1. INVITE~2. INVITE). The I-CSCF can detect a network failure of the S-CSCF in the current domain, and after receiving the session setup request of the user, the I-CSCF determines that the received request is a calling request sent from a user side to a network side and a next hop is an S-CSCF NE according to the topmost address of the Route header field in the received INVITE message, that is, an address pointed to the I-CSCF itself, and the included "orig" sign.

The I-CSCF judges whether the S-CSCF currently with which the user registers fails or not according to a next address in the Route header field of the INVITE message, and starts to assign the new S-CSCF to the user after finding that the next hop, i.e. the S-CSCF, fails.

In FIG. 6(*a*), the I-CSCF assigns the new S-CSCF to the user by adopting the manner A of Step 402.

The I-CSCF interrogates and acquires the address of the S-CSCF with which the calling user currently registers and the capability requirement on the S-CSCF for providing a service for the calling user from the HSS (3. UIR/UAR/LIR~4. UIA/UAA/LIA), which may be processed through newly added interface messages UIR/UIA, and may be processed in a manner of extending the existing interface messages UAR/UAA or LIR/LIA.

In manner 1, the newly added interface messages UIR/UIA are adopted.

UIR is a user information request.

UTA is a user information answer.

The UIR must carry only one AVP, and the AVP is an AVP Public-Identity, which is valued as an IP multimedia public identity (IMPU) of the calling user.

A message structure of the UTA is shown as follows.

| Name of Information Element | Corresponding Diameter AVP | Type | Description |
|---|---|---|---|
| Result | Result-Code/ Experimental-Result | Mandatory | Operation result. As for the value definition, please refer to Diameter protocol or 3GPP protocol. |
| S-CSCF capabilities | Server-Capabilities | Optional | It indicates the capability requirement of the S-CSCF assigned to the user. If the message does not carry the AVP, it represents that the I-CSCF can randomly assign any S-CSCF. |
| S-CSCF Name | Server-Name | Condition optional | If the user is registered, the AVP shall exist, which is valued as an address/name of the S-CSCF with which the user currently registers. |

In manner 2, the structure definition of the extended existing interface messages UAR/UAA and relevant processing thereof are adopted.

UAR is a user authorization request.

UAA is a user authorization answer.

The UAR message structure defined by the existing protocol is modified as follows.

1. A value of "RESTORE" is added for the AVP User-Authorization-Type, which is applied to a scenario of the present invention.

2. The type of the AVP User-Name is changed from mandatory to optional, and when the value of the AVP User-Authorization-Type is RESTORE, the AVP may not need to be carried.

3. The type of the AVP Visited-Network-Identifier is changed from mandatory to optional, and when the value of the AVP User-Authorization-Type is RESTORE, the AVP may not need to be carried.

After the HSS receives the UAR with the value of the AVP User-Authorization-Type as RESTORE, the content of the returned UAA message is required to be the same as that of the UTA message, and the structure definition of the UAA message is not modified in the embodiment of the present invention. That is to say, the structure of the UTA message in the embodiment of the present invention is the same as that of the UAA message in the prior art, but merely the names of the messages are different. The UAA message in the embodiment of the present invention may adopt the definition of the UAA message in the prior art.

In manner 3, the structure definition of the extended existing interface messages LIR/LIA and relevant processing thereof are adopted.

LIR is a location information request.

LIA is a location information answer.

One parameter is newly added to the LIR, and the parameter requires that the HSS carries a capability set of the S-CSCF when the HSS returns the LIA message. Once receiving the LIR message carrying the newly added parameter, the HSS carries the requested capability set in the returned LIA message. The present invention may adopt the LIA message definition in the prior art.

After acquiring the name of the S-CSCF currently providing the service for the user and the capability requirement on the S-CSCF of the user during the subscription according to any of the above manners, the I-CSCF judges whether the S-CSCF currently providing the service for the user fails or not, and if yes, the I-CSCF assigns a new S-CSCF to the user according to the capability requirement data on the S-CSCF.

Figure 6A:
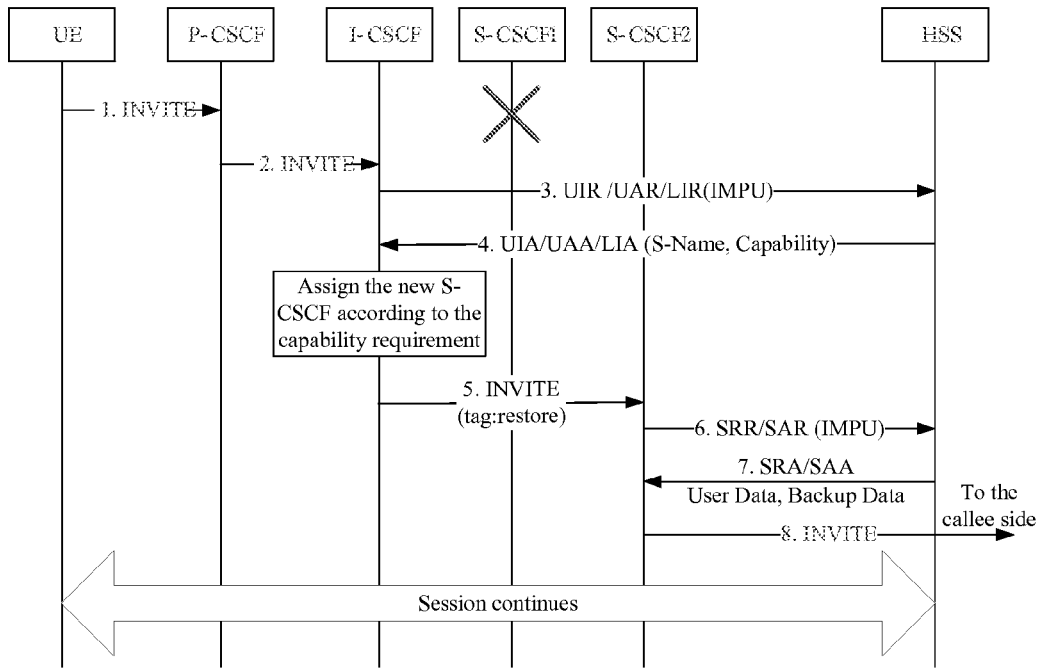
FIG. 6 is a flow chart when a calling party initiates a call for a first time after an S-CSCF with which the calling party registers fails according to an embodiment of the present invention, including FIGS. 6(a), 6(b), 6(c), and 6(d)
Figure 6B:
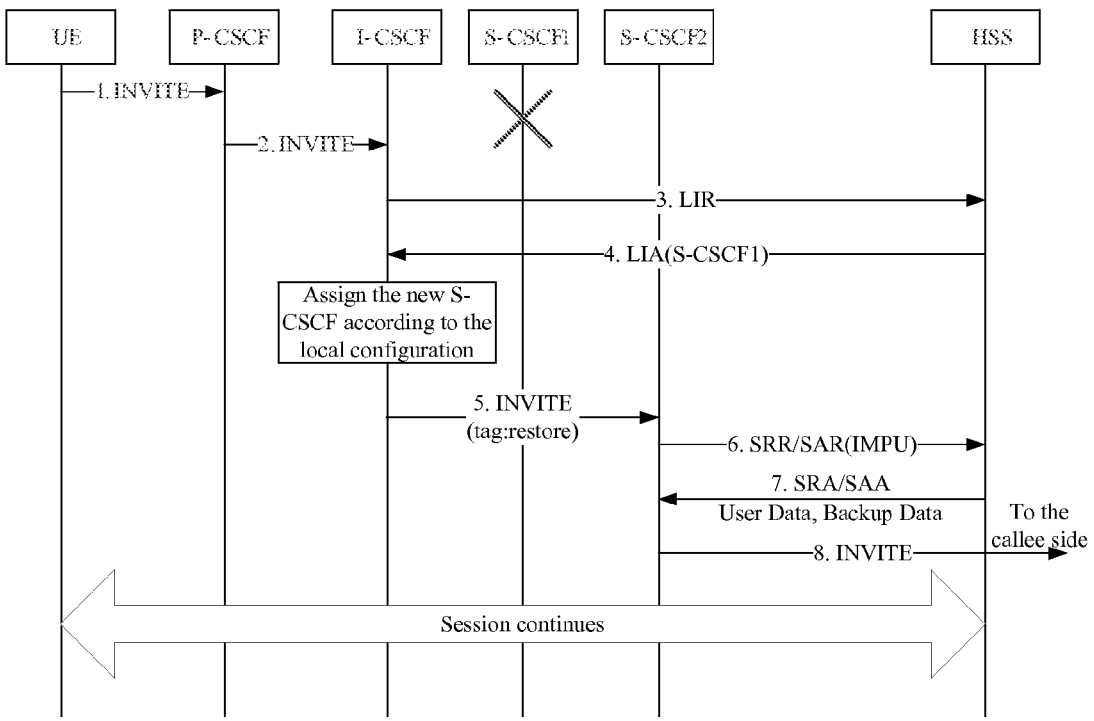
Figure 6C:
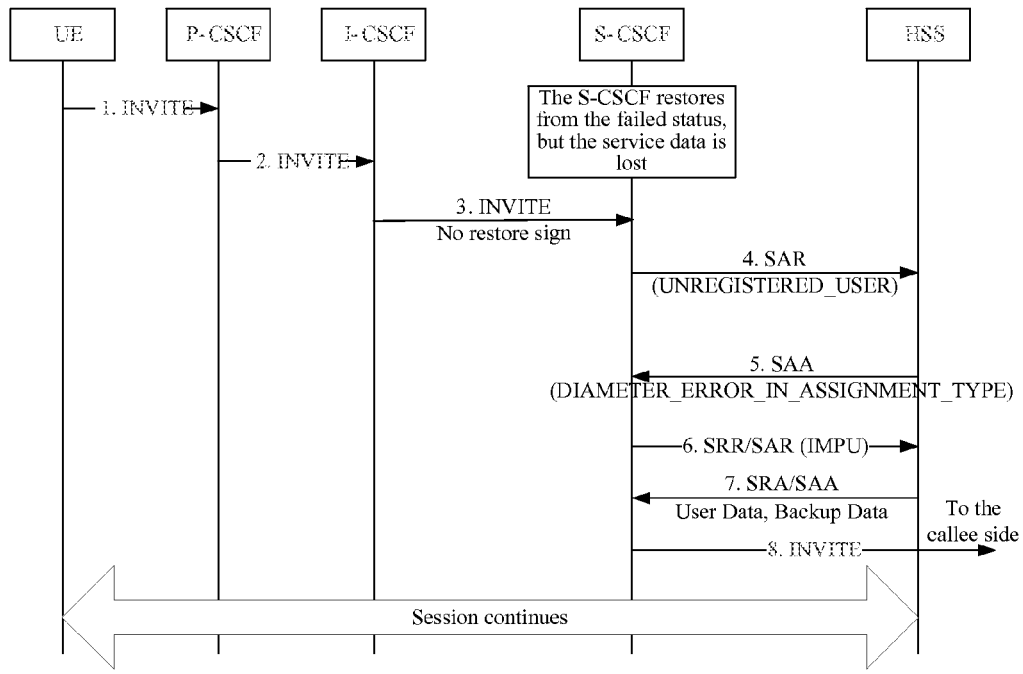

In FIG. 6(b), the I-CSCF assigns the new S-CSCF for the user by adopting the manner B in Step 402.

The I-CSCF needs to configure a local static data table, that is, an S-CSCF redundancy relation table so as to record redundancy relations among the S-CSCFs in the current domain. Particularly, in the current domain, according to the capabilities, the S-CSCFs are divided into different groups, that is, S-CSCF redundancy relation groups, and S-CSCFs in the same group have the same capability and have a redundancy relation corresponding to each other.

The I-CSCF firstly interrogates and acquires the address of the S-CSCF currently providing the service for the calling user from the HSS by utilizing the IMPU of the calling user (3. LIR~4. LIA). It should be noted that, in the present invention, it is the I-CSCF of the calling user home domain that calls the LIR/LIA, which aims at interrogating and acquiring the address of the S-CSCF currently providing the service for the calling user. After interrogating the S-CSCF currently providing the service for the user, the I-CSCF further determines the status of the S-CSCF, and if the S-CSCF is in a failed status, the I-CSCF looks up the S-CSCF redundancy relation table, finds out the S-CSCF redundancy relation group where the S-CSCF belongs to, and selects one S-CSCF there-from for being assigned to the user, which serves as the new S-CSCF for providing the service to the user.

Regardless of manner A or manner B, after finishing assigning the new S-CSCF, the I-CSCF forwards the session setup request to the newly assigned S-CSCF (5. INVITE). In the request message, the I-CSCF needs to add one disaster tolerance restoring indicator parameter "tag=restore", which represents that the session setup request is a disaster tolerance restoring session setup request, and the S-CSCF that receives such request needs to perform a restoring process.

After receiving the disaster tolerance restoring session setup request and determining that the local data of the calling user does not exist, the S-CSCF further judges whether the request carries the disaster tolerance restoring indicator or not. If it is determined that the session setup request is a disaster tolerance restoring session setup request according to the disaster tolerance restoring indicator carried in the request, the newly assigned S-CSCF interrogates and acquires the backup information and the subscription data of the user from the HSS through a disaster tolerance restoring interrogating message (6. SRR/SAR~7. SRA/SAA), and the above process is achieved through the following two detailed manners.

In manner 1, newly added interface messages SRR/SRA are adopted.

SRR is a service restore request, and a message structure of the SRR is shown as follows.

| Name of Information Element | Corresponding Diameter AVP | Type | Description |
|---|---|---|---|
| Public User Identity | Public-Identity | Mandatory | User public identity to be interrogated |
| S-CSCF Name | Server-Name | Mandatory | Address name of the S-CSCF initiating the request |

SRA is a service restore answer, and a message structure of the SRA is shown as follows.

| Name of Information Element | Corresponding Diameter AVP | Type | Description |
|---|---|---|---|
| Public User Identity | Public-Identity | Mandatory | Received user public identity |
| Registration result | Result-Code/ Experimental-Result | Mandatory | Restore operation result, and as for the value definition, please refer to Diameter protocol and 3GPP relevant protocol. |
| User Profile | User-Data | Condition optional | If the status of the user in the HSS is registered in the received request message, the AVP should exist in the message, which is valued as the subscription data of the user. |
| Associated-Back Info | Associated-Back Info | Condition optional | If the registration status of the user in the HSS is registered, the AVP should exist, which is valued as the data backed up by the original S-CSCF during the user registration. |

Associated-Back Info is a composite AVP, and the structure definition thereof is listed as follows.

Associated-Back Info::=<AVP header: TBD>
*{User-Name}
*{Charging-Information}
*{User-Backup-Data}

That is to say, when the newly assigned S-CSCF interrogates the user data backed up on the HSS by the failed S-CSCF from the HSS, the HSS sends the backup information to the newly assigned S-CSCF via the AVP User-Backup-Data nested in the AVP Associated-Back Info of the SRA message. According to the above registration flow, the AVP User-Backup-Data is sent to the HSS by the failed S-CSCF through the SAR message when the user registers in the failed S-CSCF, and is saved by the HSS.

In manner 2, the structure definition of the SAR/SAA in the existing protocol is modified.

SAR is a server assignment request.

SAA is a server assignment answer.

In the present invention, the SAR message is modified as follows.

1. A value of "RESTORE" of the AVP Server-Assignment-Type is added, which is applied to the present invention.

2. When the value of the AVP Server-Assignment-Type is RESTORE, the AVP Public-Identity must exist, which is valued as the IMPU of a disaster tolerance restoring user.

In the present invention, the SAA message is modified as follows.

1. The AVP Public-Identity must be included, which is valued as the IMPU in the request message.

2. If the registration status of the user in the HSS is registered, the AVP Associated-Back-Info should carry the backup data during the user registration.

Regardless of any of the above manners, in the embodiment of the present invention, the newly assigned S-CSCF needs to add a disaster tolerance restoring indicator parameter in the AVP Server Name of the SRR/SAR message. The HSS replaces the address of the S-CSCF for providing the service for the user and currently recorded by the HSS with the AVP Server Name carrying the disaster tolerance restoring indicator parameter. Meanwhile, the newly assigned S-CSCF tags the user as a disaster tolerance restoring user, and the disaster tolerance restoring user does not formally register with this S-CSCF.

After acquiring the restoring data of the disaster tolerance restoring user through any of the above manners, the S-CSCF restores the service data of the user, and restores a session processing of the user.

It should be noted that, the user is not registered in the newly assigned S-CSCF currently. After the S-CSCF has successfully restored the service of the user, it further needs to start a disaster tolerance restoring timer for the user, and a timeout duration thereof may be set depending upon the actual requirements. If the user does not initiate a registration flow before the timeout of the disaster tolerance restoring timer, the newly assigned S-CSCF deletes the data of the user, that is, to perform a network deregistration on the user. Once being started, the disaster tolerance restoring timer is not stopped or reset though the user performs a subsequent session. Once the user initiates a re-registration, the disaster tolerance restoring timer is terminated, and then the subsequent process is performed according to the initial registration flow provided by the present invention. The situation is described in detail as follows.

In addition, as described above, after receiving the session setup request, the S-CSCF firstly judges whether the local data of the calling user exists or not, and if the local data of the calling user exists, the call is continued according to a normal flow; otherwise, the S-CSCF further judges whether the session setup request carries the disaster tolerance restoring indicator or not. If the session setup request carries the disaster tolerance restoring indicator, the S-CSCF interrogates and acquires the backup information and the subscription data of the user from the HSS according to the disaster tolerance restoring flow (6. SRR/SAR~7. SRA/SAA).

However, another situation still exists in the practical work, that is, the S-CSCF first fails and then restores from a failed status, but the service data recorded by the S-CSCF is lost. FIGS. 6(*c*) and 6(*d*) show the processing flows under such situation. Since the S-CSCF restores from the failure, when the calling party initiates a call, the I-CSCF considers that the S-CSCF works normally so as to directly forward the session setup request without carrying a disaster tolerance restoring indicator parameter to the S-CSCF (3. INVITE).

In this case, although the S-CSCF determines that the local data of the calling user does not exist, the call request does not carry a disaster tolerance restoring indicator as well, and thus, the S-CSCF does not consider that the session setup request is a disaster tolerance restoring session setup request, but considers that the terminal that sends the session setup request is not registered yet. Therefore, the S-CSCF requests the user data from the HSS through an unregistered user interrogating message (4. SAR (UNREGISTERED_USER)).

In FIG. 6(*c*), in the records of the HSS, the calling user is registered in the S-CSCF. Thus, after receiving the interrogation request from the S-CSCF, the HSS finds that the interrogated user is currently in the "registered" status, and determines that an error occurs to the interrogation type of the S-CSCF so as to return an error response (4. SAA (DIAMETER_ERROR_IN_ASSIGNMENT_TYPE)). After receiving the error response, the S-CSCF judges whether itself restores from the failure or not, and if yes, the S-CSCF initiates a disaster tolerance restoring flow, and interrogates and acquires the backup information and the subscription data of the user from the HSS (6. SRR/SAR~7. SRA/SAA) so as to restore the service for the calling user. It should be noted that, the AVP Server in the SRR/SAR messages (6. SRR/SAR~7.

SRA/SAA) is similar to the corresponding message in FIGS. 6(a) and 6(b), so it is not repeatedly described here.

Figure 6D:
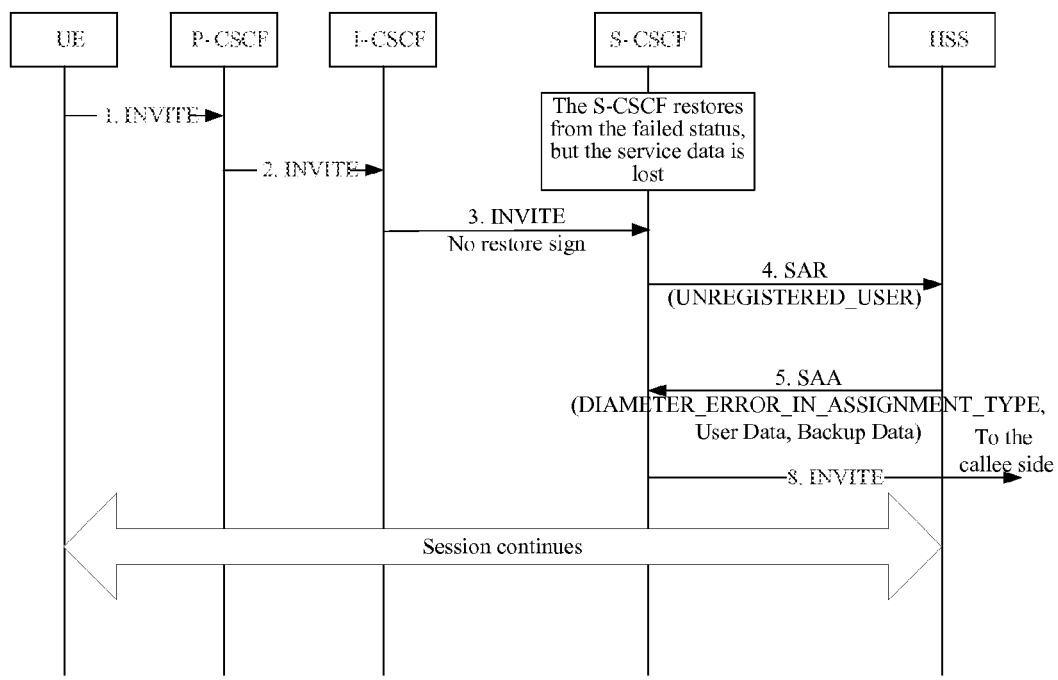

In FIG. 6(d), in the records of the HSS, the calling user is registered in the S-CSCF. Thus, after receiving the interrogation request from the S-CSCF, the HSS finds that the interrogated user is currently in the "registered" status, and determines that an error occurs to the interrogation type of the S-CSCF. Different from FIG. 6(c), when the HSS returns an error response to the S-CSCF according to FIG. 6(d), the HSS sends the backup information and the subscription data of the user to the S-CSCF (4. SAA (DIAMETER_ERROR_IN_AS-SIGNMENT_TYPE, User Data, Backup Data)). After receiving the error response, the S-CSCF directly acquires the backup information and the subscription data of the user from the error response so as to restore the service for the calling user.

Figure 7A:
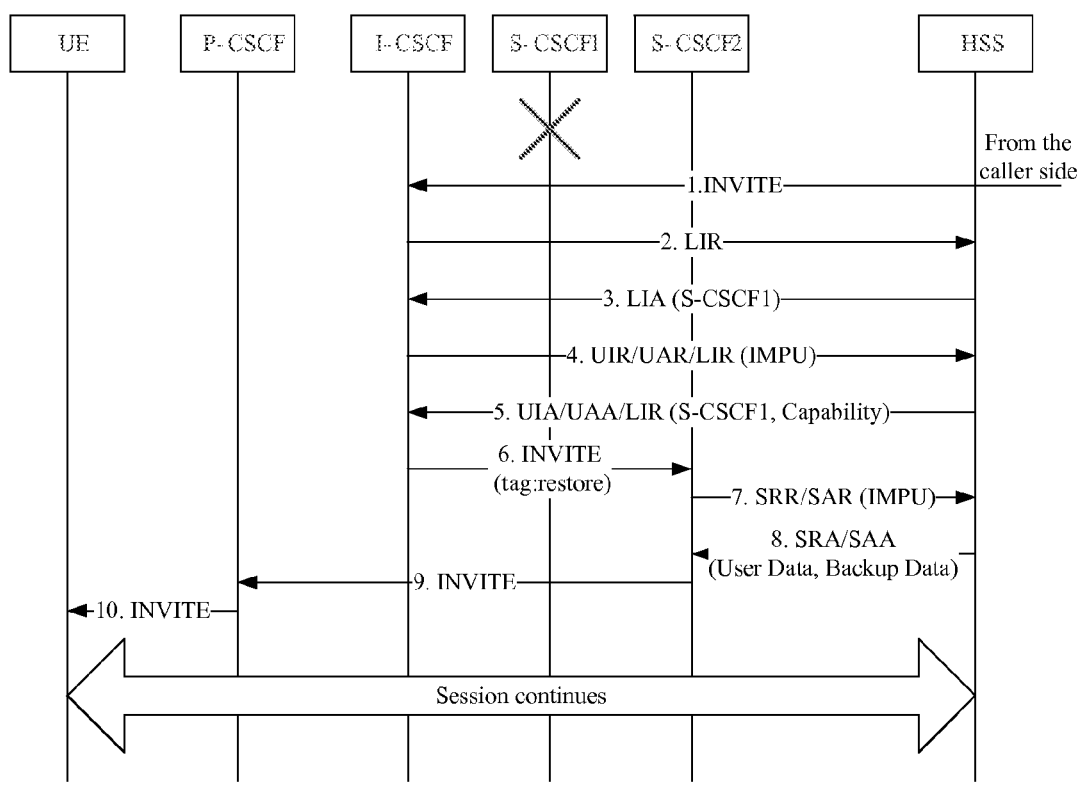
FIG. 7 is a flow chart when a call setup is performed on a called party for a first time after an S-CSCF with which the called party registers fails according to an embodiment of the present invention, including FIGS. 7(a), 7(b), 7(c)

FIG. 7(a) is a flow chart when a call setup is performed on a called party for a first time after an S-CSCF with which the called party registers fails according to an embodiment of the present invention.

After an S-CSCF1 fails, if a user registered in the S-CSCF1 serves as a called party, an I-CSCF of the current domain firstly receives a session setup request from a calling side (1. INVITE). The I-CSCF interrogates and acquires an address name of the S-CSCF with which the called user registers from the HSS, that is, the S-CSCF1, (2. LIR~3. LIA), and then the I-CSCF determines that the S-CSCF1 fails, so that the I-CSCF needs to assign a new S-CSCF to the user. Similarly, the new S-CSCF is assigned to the user according to the manner A and the manner B in Step 402. According to the manner A, the I-CSCF interrogates the capability requirement on the S-CSCF of the called user during the subscription from the HSS (4. UIR/UAR/LIR~5. UIA/UAA/LIA). Definitely, the UAR/UAA or LIR/LIA needs to be extended, the specific extending manner thereof is the same as that described above, and so it is not repeatedly described here. The I-CSCF assigns a new S-CSCF to the user according to the acquired capability requirement on the S-CSCF. According to the manner B, the I-CSCF acquires the new S-CSCF from a local configuration, without interrogating and acquiring the capability requirement on the S-CSCF from the HSS, and the detailed process thereof is the same as that described above, so it is not repeatedly described here. That is to say, in FIG. 7(a), 4. UIR/UAR/LIR~5. UIA/UAA/LIA are optional steps.

Supposing the I-CSCF assigns a new S-CSCF2 to the called user, the I-CSCF forwards a called request to the S-CSCF2 (6. INVITE), and adds a disaster tolerance restoring indicator parameter to the request. After receiving the session setup request, the S-CSCF2 determines that the request is a disaster tolerance restoring session setup request according to the disaster tolerance restoring indicator parameter, and interrogates and acquires the subscription data and the backup data of the called user from the HSS (7. SRR/SAR~8. SRA/SAA), and the detailed message content structure is the same as that described in 6. SRR/SAR~7. SRA/SAA in FIGS. 6(a) and 6(b), which thus is not repeatedly described here. After acquiring the subscription data and the backup data of the user, the S-CSCF2 restores the registration record of the called user, and forwards, according to the P-CSCF address and the contact address of the user provided in the backup data (9. INVITE), the session setup request to the P-CSCF with which the called user registers. Then, the session is continued. Similarly, the newly assigned S-CSCF also tags the user as a disaster tolerance restoring user, and the disaster tolerance restoring user does not formally registers with this S-CSCF. The newly assigned S-CSCF needs to start a disaster tolerance restoring timer.

Figure 7B:
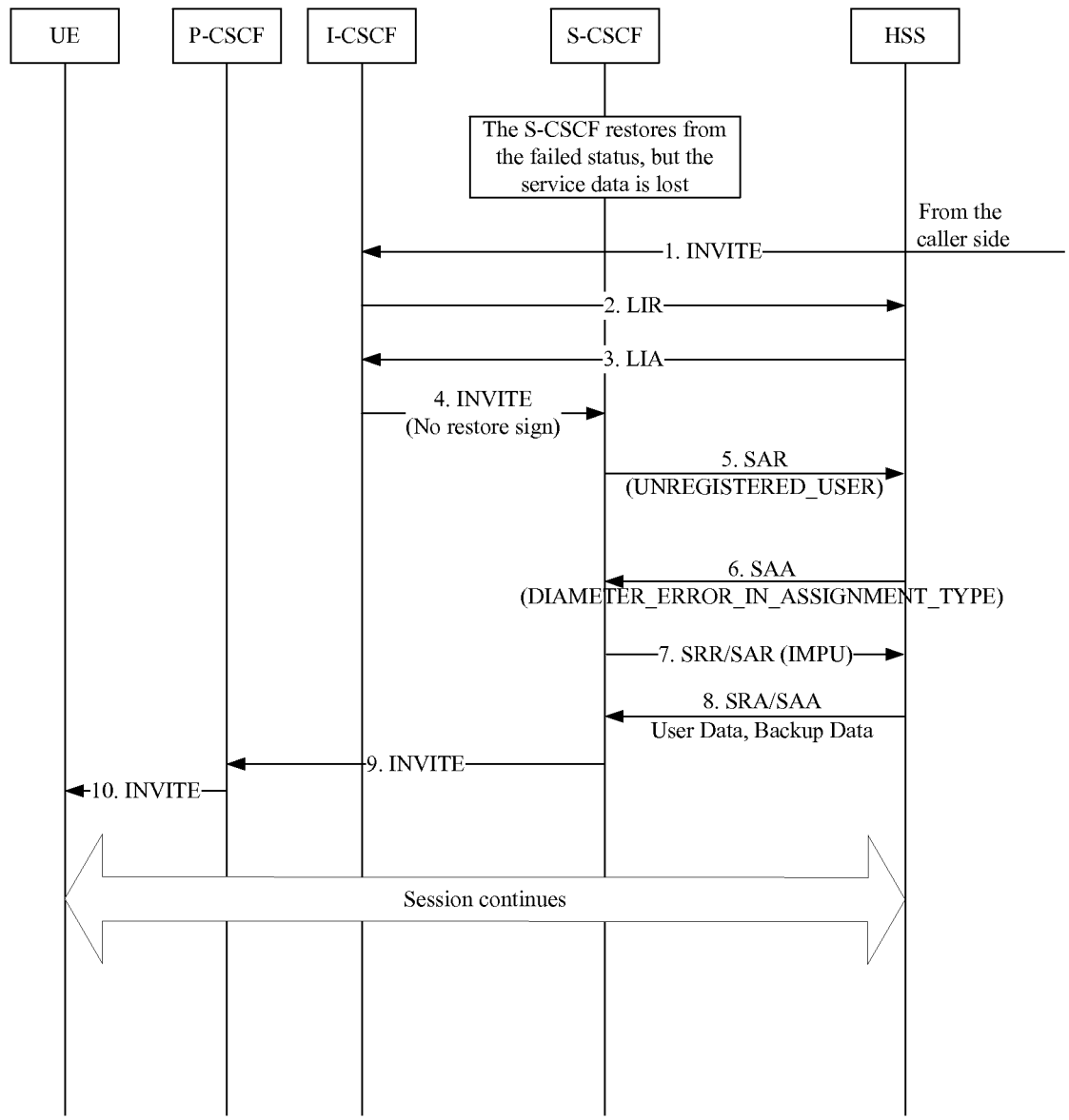
Figure 7C:
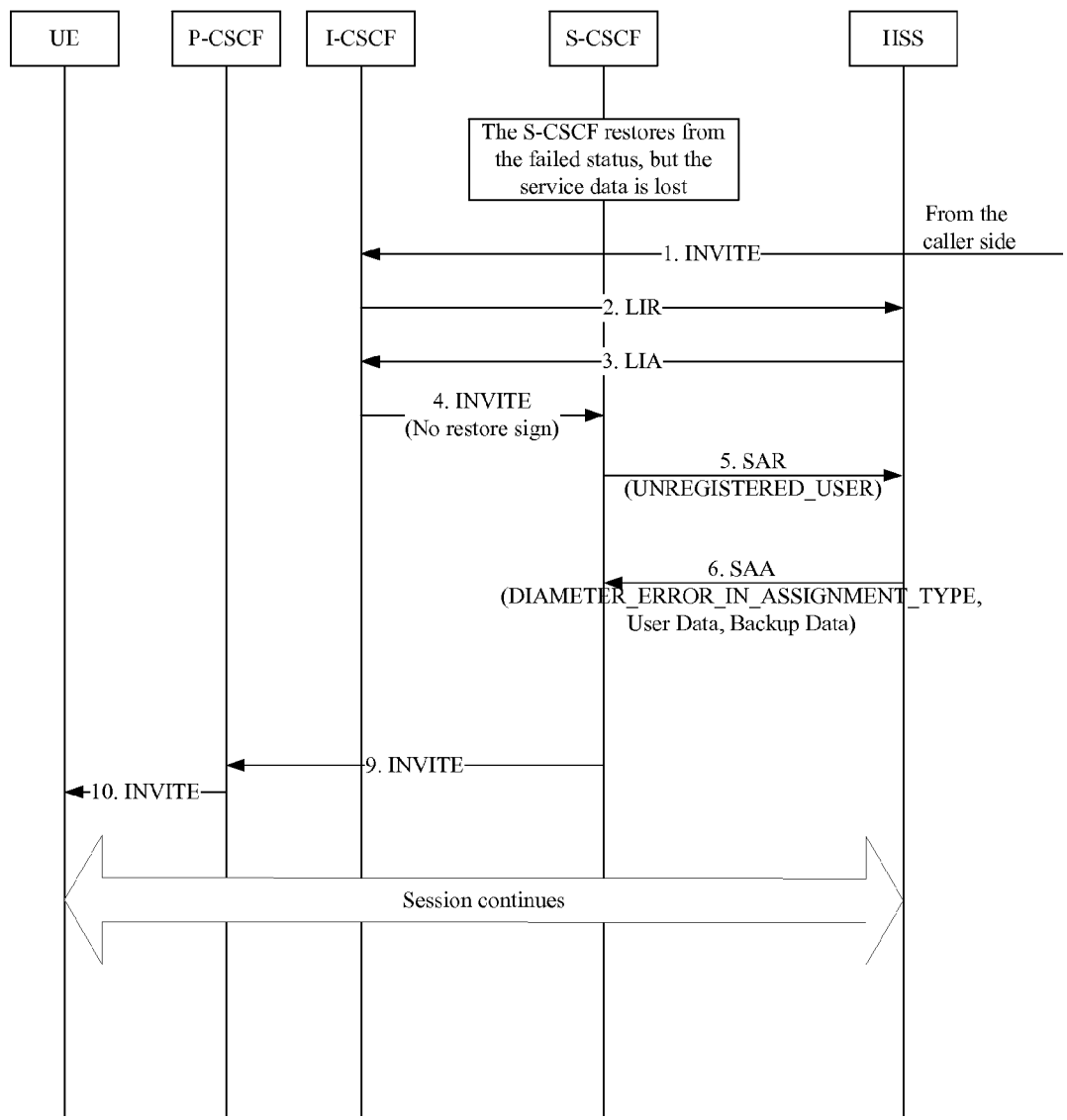

In addition, similarly, as for an S-CSCF with which the called user registers, the S-CSCF may first fail and then restore from the failed status, but the service data is lost. FIGS. 7(b) and 7(c) respectively show a processing flow under such a situation. In this case, after interrogating and acquiring an address name of the S-CSCF with which the called user from the HSS registers (2. LIR~3. LIA), the I-CSCF finds that the S-CSCF with which the called user working normally registers so as to directly forward a session setup request without carrying a disaster tolerance restoring indicator parameter to the S-CSCF with which the called user registers (4. INVITE). Then, the S-CSCF with which the called party registers and the processing flow of the HSS are similar to the S-CSCF and the processing flow of the HSS described in FIGS. 6(c) and 6(d), which thus are not repeatedly described here.

In the above embodiments, when the S-CSCF with which the calling party registers fails and when the S-CSCF with which the called party registers fails, the call setup flows adopted by the present invention have been respectively described. In FIGS. 6 and 7, the call setup is performed for the first time after the S-CSCF fails. If after the S-CSCF fails, the call setup is performed for at least once according to the flow of FIG. 6 or 7, the flow adopted in a subsequent call setup is different from that of FIG. 6 or 7, and the detailed descriptions thereof are listed as follows.

Figure 8:
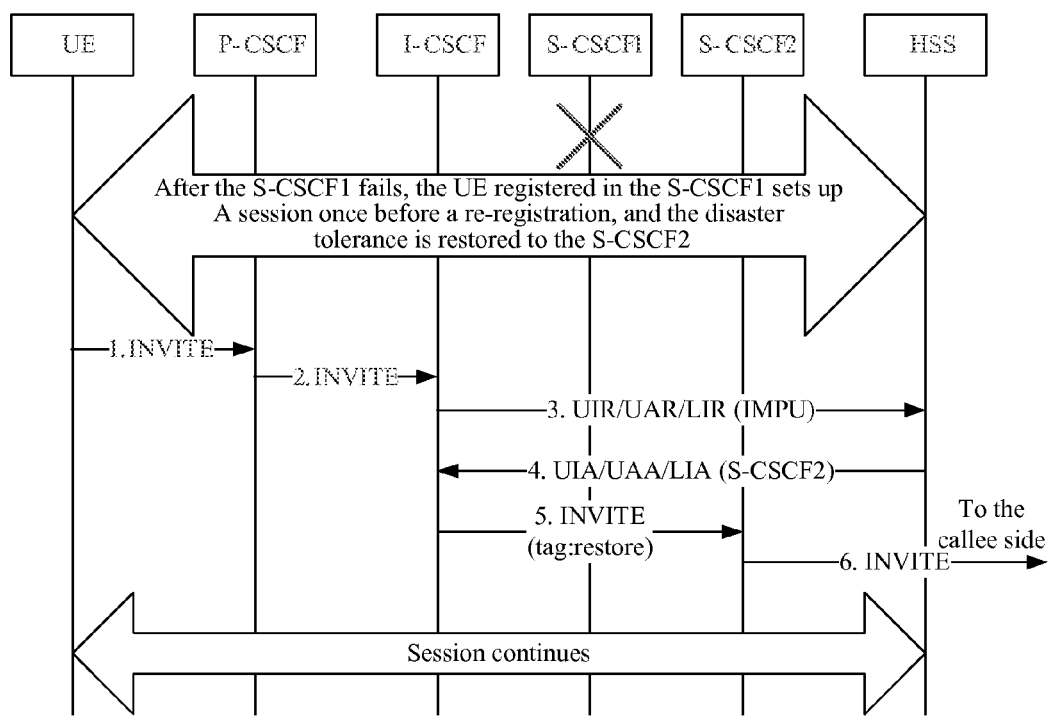
FIG. 8 is a flow chart when the calling party initiates a subsequent call after the S-CSCF with which the calling party registers fails according to an embodiment of the present invention.

FIG. 8 is a flow chart when the calling party initiates a subsequent call after the S-CSCF with which the calling party registers fails according to an embodiment of the present invention.

After the S-CSCF1 fails, if the user originally registered in the S-CSCF1 has ever performed a session before a re-registration, the I-CSCF of the user home domain assigns a new S-CSCF for the user according to the flow of FIG. 6, which is assumed to be the S-CSCF2.

If the user initiates a session again before the re-registration, the P-CSCF still routes the session to the I-CSCF according to the local Service-Route recorded during the user registration (1. INVITE~2. INVITE). After receiving the session setup request, the I-CSCF determines that the session is a calling motion, and the type of the next hop NE is the S-CSCF, so that the I-CSCF inspects a status of the next hop NE, and finds that the S-CSCF1 is in the failed status. Thus, the I-CSCF interrogates and acquires the address of the S-CSCF with which the calling user from the HSS (3. UIR/UAR/LIR~4. UIA/UAA/LIA) currently registers, and the detailed interrogation manner and the message content structure are the same as that described in FIG. 6, which thus are not repeatedly described here. As described above, the address of the S-CSCF currently providing the service for the user recorded by the HSS carries a disaster tolerance restoring indicator, so that the address of the S-CSCF2 returned by the HSS to the I-CSCF carries the disaster tolerance restoring indicator.

The I-CSCF interrogates and acquires that the S-CSCF with which the calling user currently registers is the S-CSCF2, and the I-CSCF determines that the S-CSCF2 is in a normal service status so as to forward the session setup request to the S-CSCF2 (5. INVITE), and carry the disaster tolerance restoring indicator parameter in the request.

After the S-CSCF2 receives the session setup request, since the calling user has performed the disaster tolerance restoring before, the S-CSCF2 has acquired the service data of the user, and thus, the S-CSCF2 can directly provide the service for the user, without interrogating the user data from the HSS.

Figure 9:
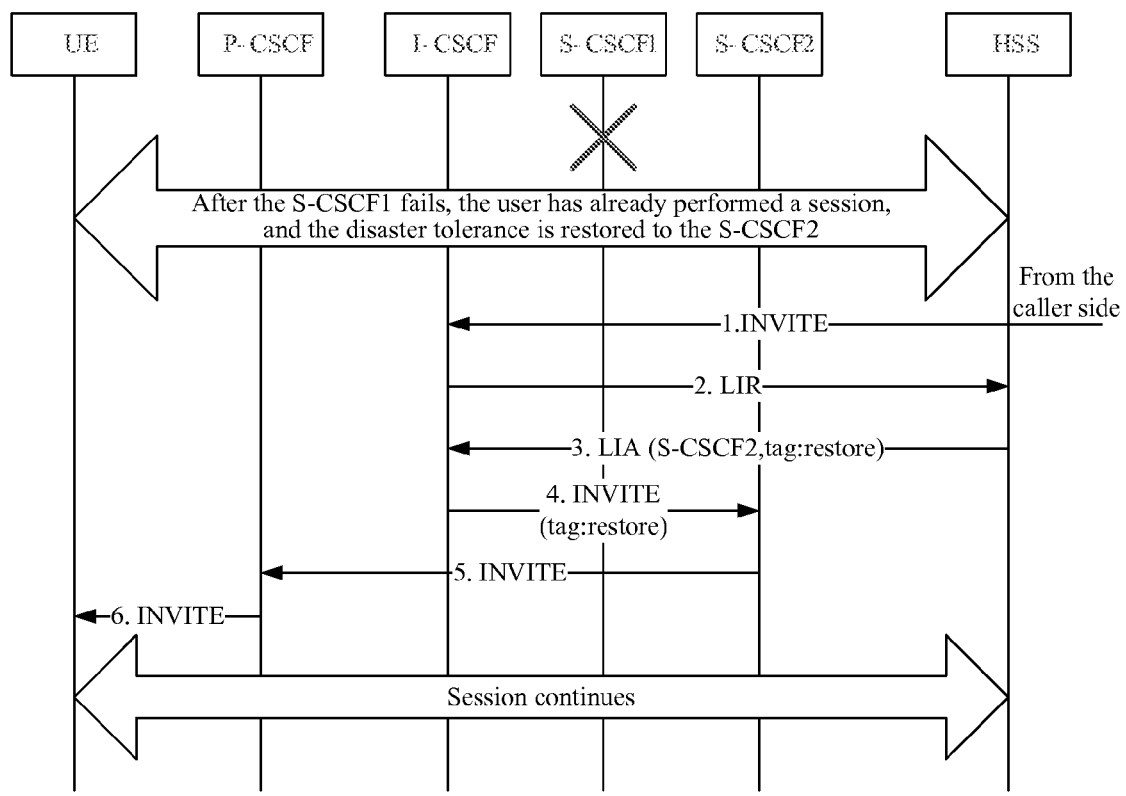
FIG. 9 is a flow chart when a subsequent call setup is performed on the called party after the S-CSCF with which the called party registers fails according to an embodiment of the present invention.

FIG. 9 is a flow chart when a subsequent call setup is performed on the called party after the S-CSCF with which the called party registers fails according to an embodiment of the present invention.

After the S-CSCF1 fails, if a user originally registering with the S-CSCF1 has ever performed a session before a re-registration, an I-CSCF of the user home domain assigns a new S-CSCF for the user according to the flow in FIG. 7, which is assumed to be the S-CSCF2.

If the user serving as a called party performs a subsequent session before the re-registration, the network processing flow is similar to that in the prior art, but the difference there-between lies in that, after interrogating and acquiring the address of the S-CSCF with which the user currently registers, i.e., the S-CSCF2, from the HSS (2. LIR-3.LIA), the I-CSCF can determine that the S-CSCF2 currently providing the service for the user is the S-CSCF selected in the disaster tolerance restoring flow according to the disaster tolerance restoring indicator parameter in the S-CSCF2 address in this embodiment. Thus, when the I-CSCF forwards the session setup request to the S-CSCF2, the I-CSCF adds the disaster tolerance restoring indicator parameter in the request message. After the S-CSCF2 receives the session setup request, since the called user has performed the disaster tolerance restoring before, the S-CSCF2 has acquired the service data of the user, and thus, the S-CSCF2 can directly provide the service for the user without interrogating the user data from the HSS.

According to the prior art, once the S-CSCF with which the user registers fails, a re-registration flow is required definitely. According to the embodiments of the present invention, before the re-registration, the user may already setup a call, and restore the user service processing by using the new S-CSCF according to the flows of FIGS. 6 to 9. Definitely, it may be possible that the user is not registered in a new S-CSCF before the re-registration. The registration flow adopted by the embodiment of the present invention is different from the prior art, and thus, under the two situations, the re-registration flow adopted by the embodiment of the present invention is also different from that in the prior art.

Figure 10:
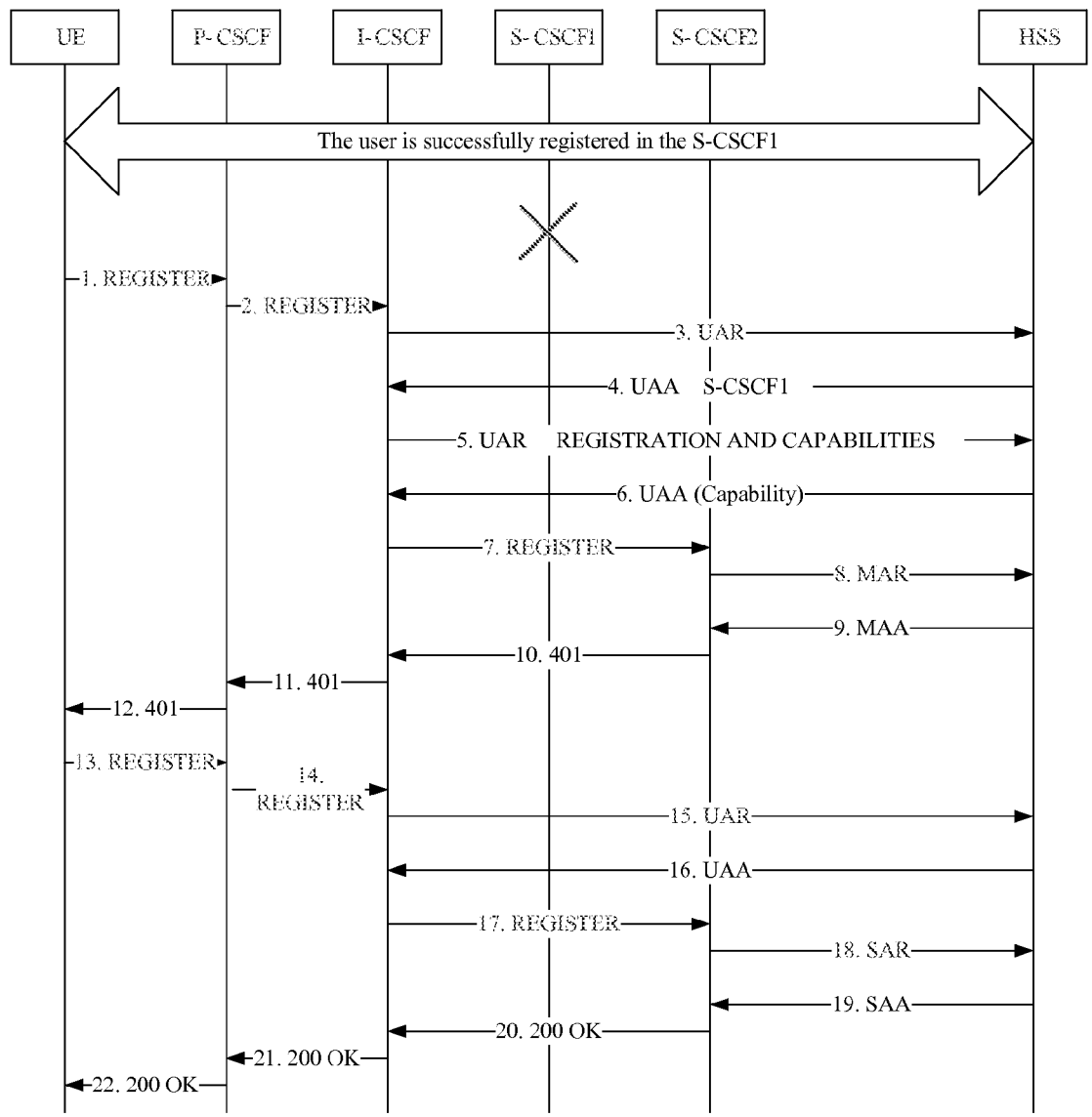
FIG. 10 is a flow chart of a re-registration performed before a disaster tolerance is restored according to an embodiment of the present invention.

FIG. 10 is a flow chart of a re-registration performed before a disaster tolerance is restored according to an embodiment of the present invention.

In FIG. 10, after the S-CSCF1 fails, if a user originally registering with the S-CSCF1 does not perform the disaster tolerance restoring process, a registration timer initiates a re-registration when a timeout occurs, so that the I-CSCF interrogates and acquires the address name of the S-CSCF currently providing the service for the user from the HSS (3. UAR~4. UAA). According to an interrogation result, the I-CSCF determines that the S-CSCF1 currently providing the service for the user is in a failed status, the I-CSCF does not forward the register request to the failed S-CSCF as in the prior art, but directly interrogates the capability requirement on the S-CSCF of the user during the subscription from the HSS (5. UAR~6.UAA), and immediately assigns a new S-CSCF for the user according to the capability requirement in the embodiment of the present invention. Then, the I-CSCF forwards the register request to the newly assigned S-CSCF (7. REGISTER). After the newly assigned S-CSCF receives the register request, the subsequent processing steps (8. MAR~22. 200 OK) are the same as the corresponding steps (6. MAR~20. 200 OK) in the initial registration flow adopted by the embodiment of the present invention in FIG. 5, which thus are not repeatedly described here.

Figure 11:
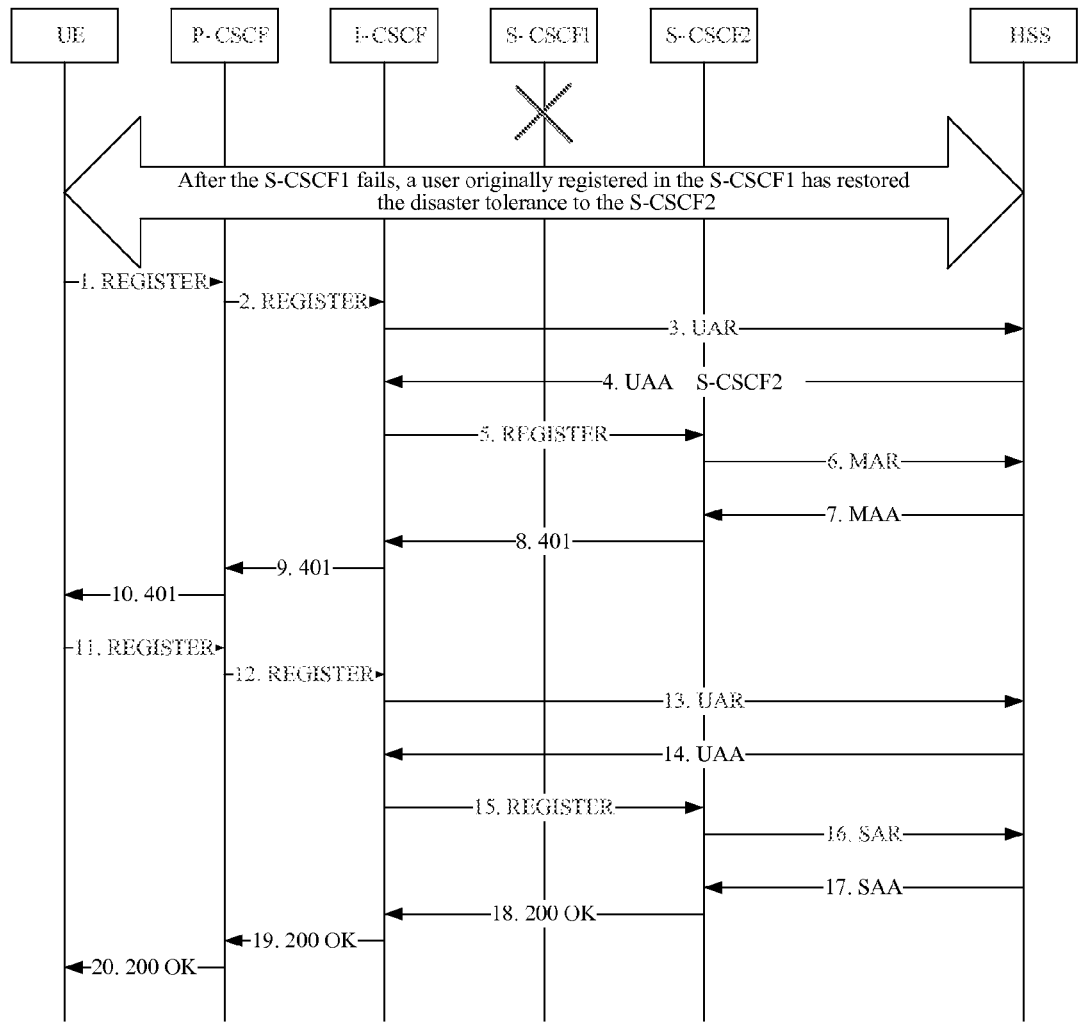
FIG. 11 is a flow chart of a re-registration performed after a disaster tolerance is restored according to an embodiment of the present invention.

FIG. 11 is a flow chart of a re-registration performed after a disaster tolerance is restored according to an embodiment of the present invention.

After the S-CSCF1 fails, if the user originally registered in the S-CSCF1 has performed the disaster tolerance restoring process before the re-registration, as mentioned above, the newly assigned S-CSCF provides the service for the user, but the user does not formally registers with the newly assigned S-CSCF.

When the user initiates a re-registration because the registration timer times out, the register request is forwarded to the I-CSCF of the user home domain (1. REGISTER~2. REGISTER). The I-CSCF interrogates the S-CSCF currently providing the service for the user from the HSS, and the HSS sends the S-CSCF2 address with the disaster tolerance restoring tag to the I-CSCF (3. UAR~4. UAA). Then, the I-CSCF forwards the register request to the S-CSCF2 according to the address.

Since the user currently applying for a registration is a disaster tolerance restoring user, the S-CSCF2 may be set to perform an authentication on the user according to the disaster tolerance restoring tag carried in the register request (6. MAR~15. REGISTER), and definitely, the authentication step may be omitted. After the authentication is successfully passed, the S-CSCF2 formally records that the user registration is successful to the HSS (16. SAR~17. SAA), and no disaster tolerance restoring indicator is carried during the above recording process. Furthermore, the HSS needs to update the S-CSCF2 address with the disaster tolerance restoring indicator originally recorded by the HSS with the S-CSCF2 address without the disaster tolerance restoring indicator. Meanwhile, the newly assigned S-CSCF also tags the user as a formally registered user.

The subsequent steps are the same as the corresponding steps (18. 200 OK~20. 200 OK) in the initial registration flow of the present invention in FIG. 5, which thus are not repeatedly described here.

If the S-CSCF restores from the failed status, and during the period of restoring from the failed status, no re-registration due to the timeout of the registration timer is triggered, and no disaster tolerance restoring flow is triggered due to a relevant session setup request, the possible scenarios under such situations include, for example, the S-CSCF is reset/restarted, and a communication network of the S-CSCF fails and then restores to a normal status and the like.

In this case, when the I-CSCF detects that the S-CSCF fails, the I-CSCF starts an acknowledgement timer for the failed S-CSCF, and determines that a duration of the acknowledgement timer is a maximum registration cycle in the current domain.

After a certain failed S-CSCF restores to a normal status, if the I-CSCF receives a session setup request sent to the S-CSCF, the I-CSCF forwards the session setup request to the S-CSCF. If the acknowledgement timer started for the S-CSCF does not time out, the I-CSCF must add a disaster tolerance restoring indicator parameter when the I-CSCF forwards the session setup request to the S-CSCF. If the acknowledgement timer times out, it represents that all the users with the service provided by the S-CSCF have performed the re-registration for at least once, so that no disaster tolerance restoring indicator parameter is added.

After the S-CSCF receives the session setup request, if it is found that the relevant user is not registered to this S-CSCF, under the situation that the request carries the disaster tolerance restoring indicator parameter, the S-CSCF performs the relevant processing according to the flow of the present invention. On the contrary, if the request does not carry the disaster tolerance restore indicator parameter, the S-CSCF performs the relevant processing according to the prior art.

In order to realize the above methods of the present invention, it is needed to correspondingly extend the structures and functions of the existing I-CSCF, S-CSCF, and HSS.

Figure 12:
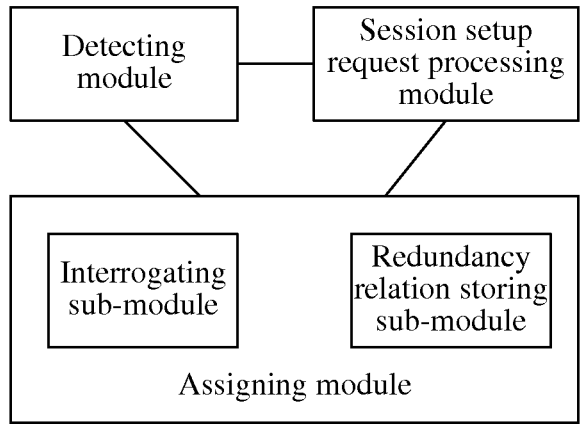
FIG. 12 is a block diagram of an I-CSCF according to an embodiment of the present invention.

FIG. 12 is a block diagram of an I-CSCF according to an embodiment of the present invention.

In an I-CSCF provided according to the present invention, three modules are increased or modified on the basis of the existing I-CSCF, including a detecting module, an assigning module, and a session setup request processing module.

The detecting module is connected to the assigning module and the session setup request processing module, and is adapted to judge, according to a received session setup request, whether an S-CSCF with which a user registers and an S-CSCF currently providing a service for the user fails or not, and if yes, the detecting module instructs the assigning module to assign a new S-CSCF to the current user; otherwise, the detecting module instructs the session setup request processing module to forward the session setup request.

In order to judge whether the S-CSCF fails or not, the detecting module needs to firstly acquire an S-CSCF address. Therefore, the detecting module further includes an address acquiring sub-module, adapted to acquire the S-CSCF address. The address acquiring sub-module resolves a Route header field in the session setup request to acquire the S-CSCF address, or interrogates and acquires the address of the S-CSCF currently providing the service for the user from the HSS according to the user identity in the session setup request.

The assigning module is connected to the detecting module and the session setup request processing module, and is adapted to assign the new S-CSCF to the user according to an instruction from the detecting module, and instruct the session setup request processing module to forward the session setup request after finishing assigning the new S-CSCF.

The assigning module may include any one of an interrogating sub-module and a redundancy relation storing sub-module. The interrogating sub-module is adapted to interrogate a capability requirement on an S-CSCF in subscription data of the user from the HSS, and assign the S-CSCF to the user according to the capability requirement. The redundancy relation storing sub-module is adapted to store S-CSCF redundancy relation groups, select one S-CSCF from a corresponding redundancy relation group according to the address of the S-CSCF currently providing the service for the user, and assign the S-CSCF to the user.

The session setup request processing module is connected to the detecting module and the assigning module, and is adapted to forward the session setup request according to an instruction from the detecting module or the assigning module. If the session setup request is forwarded according to an instruction from the detecting module, the received session setup request is directly forwarded. If the session setup request is forwarded according to an instruction from the assigning module, a disaster tolerance restoring indicator is carried in the session setup request. The operation of judging whether the instruction is sent from the detecting module or the assigning module may be finished by an instruction determination sub-module in the session setup request processing module.

Figure 13:
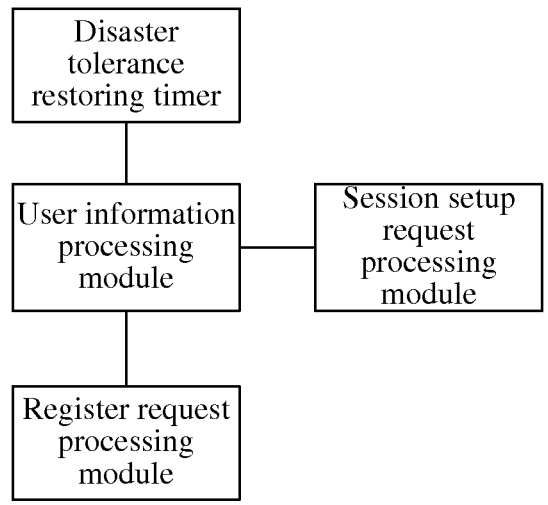
FIG. 13 is a block diagram of an S-CSCF according to an embodiment of the present invention.

FIG. 13 is a block diagram of an S-CSCF according to an embodiment of the present invention.

In an S-CSCF provided according to an embodiment of the present invention, four modules are increased or modified on the basis of the existing S-CSCF, including a register request processing module, a session setup request processing module, a user information processing module, and a disaster tolerance restoring timer.

The register request processing module is connected to the user information processing module, and is adapted to receive a user registration, send a self address and an address of an I-CSCF of the current domain to the user, store service data of the user in the user information processing module, and instruct the user information processing module to back up necessary data which is required when a user service processing is restored on a storage entity in a network.

The session setup request processing module is connected to the user information processing module, and is adapted to process a received session setup request according to user information.

Particularly, the session setup request processing module includes a service data interrogating sub-module, a disaster tolerance restoring indicator interrogating sub-module, and a session setup request forwarding sub-module.

The service data interrogating sub-module is adapted to interrogate whether the user information processing module has service data or not, and if yes, the service data interrogating sub-module sends the session setup request to the session setup request forwarding sub-module; otherwise, the service data interrogating sub-module sends the session setup request to the disaster tolerance restoring indicator interrogating sub-module.

The session setup request forwarding sub-module is adapted to forward the session setup request according to the service data.

The disaster tolerance restoring indicator interrogating sub-module judges whether the session setup request carries a disaster tolerance restoring indicator or not, and if yes, the disaster tolerance restoring indicator interrogating sub-module instructs the user information processing module to send a disaster tolerance restoring interrogation request to the storage entity in the network and acquires the service data; otherwise, the disaster tolerance restoring indicator interrogating sub-module instructs the user information processing module to send an unregistered user interrogation request to the storage entity in the network and acquires the service data.

The error response processing sub-module is adapted to judge whether an error response includes the service data or not after receiving the error response from the storage entity in the network, in which when the error response does not include the service data and the S-CSCF itself just restores from the failed status, the error response processing sub-module instructs the user information processing module to send the disaster tolerance restoring interrogation request to the storage entity in the network and acquires the service data.

The disaster tolerance restoring indicator interrogating sub-module and the error response processing sub-module are optional, that is, when the service data interrogating sub-module determines that the user information processing module does not have any service data, the service data interrogating sub-module can directly instruct the user information processing module to acquire the service data from the storage entity in the network.

The user information processing module is connected to the register request processing module and the session setup request processing module, and is adapted to store the service data and interact with the storage entity in the network so as to back up and acquire the necessary data which is required when the user service processing is restored.

Particularly, the user information processing module backs up the necessary data which is required when the user service processing is restored on the storage entity in the network according to an instruction from the register request processing module, and acquires the necessary data which is required when the user service processing is restored from the storage entity in the network according to an instruction from the session setup request processing module. That is to say, the user information processing module further includes a backup sub-module and an interrogating sub-module.

When the necessary data on the storage entity in the network backs up, the backup sub-module sends the S-CSCF address to the storage entity in the network. When acquiring the necessary data which is required when the user service processing is restored is requested from the storage entity in the network, if the interrogating sub-module receives an instruction from the disaster tolerance restoring indicator interrogating sub-module about sending the disaster tolerance restoring interrogation request to the storage entity in the network and acquiring the service data, the interrogating sub-module sends the S-CSCF address with the disaster tolerance restoring indicator to the storage entity in the network. After acquiring the necessary data which is required when the user service processing is restored, the interrogating sub-module instructs the session setup request processing module to continuously process the session setup request.

The user information processing module further includes a timer starting sub-module, which is adapted to start a disaster tolerance restoring timer after acquiring the necessary data which is required when the user service processing is restored.

The disaster tolerance restoring timer is adapted to count the time after being started, and if the user dose not initiates a registration flow before the timeout of the disaster tolerance restoring timer, the disaster tolerance restoring timer instructs the user information processing module to perform a network deregistration on the user, that is, to delete a data of the user. The disaster tolerance restoring timer is optional.

The storage entity in the network is usually an HSS.

Figure 14:
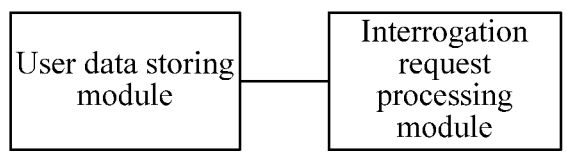
FIG. 14 is a block diagram of an HSS according to an embodiment of the present invention.

FIG. 14 is a block diagram of an HSS according to an embodiment of the present invention.

In an HSS provided according to the present invention, two modules are increased and modified on the basis of the existing HSS, including a user data storing module and an interrogation request processing module.

Specifically, the user data storing module is adapted to store subscription data of a user, necessary data which is required when a user service is restored, and an S-CSCF with which the user registers. The interrogation request processing module is adapted to extract corresponding information from the user data storing module according to an interrogation request and return the corresponding information to a party that sends the interrogation request.

In particular, the interrogation request processing module includes an S-CSCF interrogation request determination sub-module, a disaster tolerance restoring interrogation request processing sub-module, and an unregistered user interrogation request processing sub-module.

The S-CSCF interrogation request determination sub-module is adapted to judge whether the interrogation request from the S-CSCF is a disaster tolerance restoring interrogation request or an unregistered user interrogation request, send the request to the disaster tolerance restoring interrogation request processing sub-module for being processed if it is the disaster tolerance restoring interrogation request; and send the request to the unregistered user interrogation request processing sub-module for being processed if it is the unregistered user interrogation request.

The disaster tolerance restoring interrogation request processing sub-module is adapted to extract corresponding information from the user data storing module according to the interrogation request and return the corresponding information to the S-CSCF.

The unregistered user interrogation request processing sub-module is adapted to judge whether the user is registered or not according to the S-CSCF with which the user registers, and extract the corresponding information from the user data storing module and return the corresponding information to the S-CSCF if the user is not registered; and return an error response to the S-CSCF if the user is registered. Under the situation that the user is registered, the HSS can also extract the corresponding information from the user data storing module, carries the corresponding information in the error response, and returns the error response to the S-CSCF.

It will be apparent to those skilled in the art that various modifications and variations can be made to the structure of the present invention without departing from the scope or spirit of the invention. In view of the foregoing, it is intended that the present invention cover modifications and variations of this invention provided that they fall within the scope of the following claims and their equivalents.

What is claimed is:

1. In a serving call session control function (S-CSCF), a method for realizing an Internet protocol multimedia subsystem (IMS) disaster tolerance, the method comprising:
   receiving a service request of a user forwarded by an interrogating CSCF (I-CSCF) when it is determined that a previous S-CSCF failed in providing a service to the user;
   sending a request for subscription data of the user and restoration data stored in a storage entity and used for restoring the service that failed to the user, wherein the restoration data is stored by the previous S-CSCF;
   receiving the stored data that includes the subscription data of the user and the restoration data; and
   based on the received data, restoring the service to the user.

2. The method according to claim 1, wherein the service request carries a disaster tolerance restoring indicator to represent that this service request is a disaster tolerance restoring service request.

3. The method according to claim 2, wherein after receiving the service request, the method further comprises:
   determining that the service request is a disaster tolerance restoring request according to the disaster tolerance restoring indicator; and
   before sending the request for the subscription data of the user and the restoration data stored in the storage entity, including an address of the S-CSCF as an indication that the S-CSCF intends to restore the service to the user.

4. The method according to claim 1, wherein the restoration data includes a session initiation protocol (SIP) URL of a proxy CSCF (P-CSCF) assigned for the user to enter the IMS subsystem and a contact address of the user.

5. A serving call session control function (S-CSCF) for realizing an Internet protocol multimedia subsystem (IMS) disaster tolerance, comprising
   a receiver, configured to receive a service request of a user forwarded by an interrogating CSCF (I-CSCF) when it is determined that a previous S-CSCF failed in providing a service to the user;
   a transmitter, configured to send a request for subscription data of the user and restoration data stored in a storage entity and used for restoring the service that failed to the user, wherein the restoration data is stored by the previous S-CSCF;

a processor, configured to restore the service to the user after the subscription data of the user and the restoring data is received by the receiver from the storage entity.

6. The S-CSCF according to claim 5, wherein the receiver is further configured to receive the service request carrying a disaster tolerance restoring indicator to represent that this service request is a disaster tolerance restoring service request.

7. In a serving call session control function (S-CSCF), a computer program product comprising computer executable instructions stored on a non-transitory computer readable medium such that when executed by a computer program processor cause the S-CSCF to perform a method for realizing an Internet protocol multimedia subsystem (IMS) disaster tolerance by the following:

receive a service request of a user forwarded by an interrogating CSCF (I-CSCF) when it is determined that a previous S-CSCF failed in providing a service to the user;

send a request for subscription data of the user and restoration data stored in a storage entity and used for restoring the service that failed to the user, wherein the restoration data is stored by the previous S-CSCF;

receive the stored data that includes the subscription data of the user and the restoration data; and based on the received data, restore the service to the user.

8. The computer program product of claim 7, wherein the service request carries a disaster tolerance restoring indicator to represent that this service request is a disaster tolerance restoring service request.

9. The computer program product of claim 8, wherein after receiving the service request, the computer executable instructions further cause the S-CSCF to:

determine that the service request is a disaster tolerance restoring request according to the disaster tolerance restoring indicator; and before sending the request for the subscription data of the user and the restoration data stored to the storage entity, include an address of the S-CSCF as an indication that the S-CSCF intends to restore the service to the user.

10. The computer program product of claim 7, wherein the restoration data includes a session initiation protocol (SIP) URL of a proxy CSCF (P-CSCF) assigned for the user to enter the IMS subsystem and a contact address of the user.

* * * * *